(12) United States Patent
Jain

(10) Patent No.: US 6,791,736 B2
(45) Date of Patent: Sep. 14, 2004

(54) OPTICAL DEVICE FOR DISPERSION COMPENSATION

(75) Inventor: Ajaykumar R. Jain, Palo Alto, CA (US)

(73) Assignee: Teralum LLC, Brattleboro, VT (US)

( * ) Notice: Subject to any disclaimer, the term of this patent is extended or adjusted under 35 U.S.C. 154(b) by 0 days.

(21) Appl. No.: 10/165,686

(22) Filed: Jun. 6, 2002

(65) Prior Publication Data

US 2002/0191299 A1 Dec. 19, 2002

Related U.S. Application Data

(60) Provisional application No. 60/299,540, filed on Jun. 19, 2001.

(51) Int. Cl.[7] .............................. G02F 1/03; G02F 1/07
(52) U.S. Cl. ...................... 359/261; 359/260; 359/578
(58) Field of Search ................................ 359/260–261, 359/578, 637, 577; 372/92, 99; 356/454, 506

(56) References Cited

U.S. PATENT DOCUMENTS

| | | | |
|---|---|---|---|
| 4,822,998 A | 4/1989 | Yokota et al. .............. 250/226 |
| 5,557,468 A | 9/1996 | Ip .............................. 359/615 |
| 6,259,847 B1 | 7/2001 | Lenz et al. .................. 385/131 |
| 6,289,151 B1 | 9/2001 | Kazarinov et al. ............ 385/32 |
| 6,292,299 B1 | 9/2001 | Liou ........................... 359/583 |
| 6,323,987 B1 | 11/2001 | Rinaudo et al. ............ 359/260 |
| 6,371,662 B1 | 4/2002 | Leard et al. .................. 385/88 |
| 6,373,574 B1 | 4/2002 | Gu et al. ..................... 356/419 |
| 6,391,400 B1 * | 5/2002 | Russell et al. ................ 428/34 |
| 2002/0154410 A1 * | 10/2002 | Levner et al. .............. 359/559 |

OTHER PUBLICATIONS

Lenz et al, Optical Filter Dispersion in WDM Systems: A Review, 1999, OSA TOPS, vol 29, WDM Components, pp 246–253.

Madsen et al, Integrated Optical Allpass Filters for Dispersion Compensation, 1999, OSA TOPS, vol 29, WDM Components, pp 142–149.

Jablonski et al, The Realization of All–Pass Filters for Third–Order Dispersion Compensation in Ultrafast Optical Fiber Transmission Systems, Aug. 2001, Journal of Lightwave Technology, vol. 19, No. 8, pp 1194–1205.

Slocum et al, Dispersion Compensation, May 29, 2001, Wit Soundview Corp. Report.

Jungjohann et al, Will Dispersion Kill Next Generatin 40 Gigabit Networks?, Jun. 19, 2001, CIBC World Markets Equity Research.

Optical Coating Laboratory, Inc., Selectraband Linear Variable Filters, OCLI Specification Sheet, 2001.

* cited by examiner

Primary Examiner—Jordan M. Schwartz
Assistant Examiner—Jessica Stultz
(74) Attorney, Agent, or Firm—Michael Pritekau

(57) ABSTRACT

An optical device for receiving input light and for acting on the input light to produce output light includes a first reflector and a second reflector supported in a spaced-apart, confronting relationship with the first reflector such that the input light received by the optical device, at least potentially, undergoes multiple reflections between the first and second reflectors. At least a selected one of the first and second reflectors is configured to subject each one of a plurality of different portions of the input light to one of a plurality of different reflectance values to produce an emitted light passing through at least the selected reflector in a way which is combinable to generate the output light.

2 Claims, 19 Drawing Sheets

OPTICAL DEVICE FOR DISPERSION COMPENSATION

RELATED APPLICATION

The present application claims priority from U.S. Provisional Application No. 60/299,540, entitled DISPERSION COMPENSATION USING GRADED FILMS, filed Jun. 19, 2001 under 35 U.S.C. §119(e).

BACKGROUND OF THE INVENTION

The present invention relates to optical devices and, more specifically, to optical devices that enable control of dispersion in optical communication systems.

The demand for greater bandwidth in optical communications is driving the fiber-optic telecommunications industry to explore technologies to achieve faster transmission speeds and increased capacity. The increase in bandwidth, however, is limited by a number of fundamental factors such as attenuation, noise and dispersion.[1,2] In particular, dispersion is problematic because it distorts and/or broadens the optical pulses used to carry information through the optical communication system, thereby leading to data transmission error, especially in long haul and/or high speed systems.

Various attempts have been made to control or counteract dispersion in optical communication networks. For example, dispersion compensating fibers (DCFs) are available from companies such as Lucent Technologies/OFS and Corning to provide a negative dispersion across a specific operating band.[1,2] However, since DCFs provide essentially constant negative dispersion, DCFs are generally useful only for dispersion correction at one wavelength at a time. That is, a series of DCFs are needed to control dispersion over the full range of wavelengths used in the optical communication system. Therefore, dispersion compensation solutions based on DCFs tend to be complicated and expensive.

Another approach to dispersion control is the use of fiber Bragg gratings.1,2 A fiber Bragg grating includes a chirped Bragg grating or a number of Bragg gratings designed to reflect different wavelengths all formed in a length of fiber so as to provide dispersion compensation on input light. Like DCFs, however, fiber Bragg gratings are limited in the range of wavelengths over which they are effective. Therefore, several gratings are needed to provide dispersion compensation over the optical communication wavelength range. Fiber Bragg gratings can also induce dispersion ripple, which leads to undesirable distortion of the optical signals.

Still other dispersion compensation schemes involve the use of all-pass filters.[3-6] All-pass filters are optical filters designed to provide phase compensation without affecting the amplitude of input light.[3] For example, in U.S. Pat. No. 6,289,151 B1, Kazarinov et al. (hereinafter, Kazarinov) describes an all-pass filter based on a number of ring resonators in a plurality of feedback loops. The all-pass filter of Kazarinov compensates for optical signal dispersion by applying a frequency-dependent time delay to portions of the optical signal in the feedback loops. The frequency-dependent time delay is provided by cascaded or series ring resonators, each of the ring resonators having a different phase. One problem arises with respect to the all-pass filter of Kazarinov, however, is submitted since a plurality of ring resonators and couplers are needed to provide dispersion compensation over the optical communication bandwidth. Also high manufacturing tolerances are required to ensure balanced performance of the device in compensating the dispersion of optical signal at a range of frequencies.

As another example of an all-pass filter, J. Ip in U.S. Pat. No. 5,557,468 (hereinafter, Ip) discloses a dispersion compensation device based on a reflective Fabry-Perot etalon.[7] The all-pass filter of Ip includes a Fabry-Perot etalon including two reflectors. Each reflector includes a single uniform reflectance value that is different from the reflectance value of the other reflector so as to provide an input port and a separate output port for monitoring, for example, the frequency of the signal output of the all-pass filter. Again, the range of frequencies over which the all-pass filter of Ip is effective remains limited. Ip suggests the use of two or more Fabry-Perot etalons with dissimilar reflectivity characteristics and offset center frequency response, but it is submitted that the manufacturing tolerances for such a multi-stage cascaded device make the device impractical.

A Fabry-Perot etalon including a 100% reflectance mirror as one of its reflectors (also known as a Gires-Tournois interferometer) is also used as an all-pass filter. However, since the Fabry-Perot etalon generally provides an output in the form of a series of Gaussian peaks, it is difficult to manufacture a single stage Gires-Tournois ferometer exhibiting the desired phase response over a desired range of wavelengths.

Still another example of an all-pass filter for dispersion compensation is a thin film-based coupled cavity all-pass (CCAP) filter as discussed, for example, by Jablonski et al.[8] The CCAP filter of Jablonski et al. is essentially a series of interference filters cascaded together. The CCAP filter of Jablonski et al. is similar to the aforedescribed Kazarinov approach in that the CCAP filter consists of two or more cavities disposed between reflectors and cascaded together to form a single filter. The thin film-based CCAP filter includes a plurality of alternating low index and high index thin films designed to form a stack of reflector sections separated by low index "cavity" sections. The thin film configuration allows the device to be compact compared to the use of a series of adjacent Fabry-Perot filters. However, the design of the thin film-based CCAP filter including more than two cavities is submitted to be mathematically problematic and, further, since the number of materials available for use as the low index and high index materials is limited, the filter is difficult to implement as a practical device.

The present invention provides an optical device for dispersion compensation which serves to reduce or eliminate the foregoing problems in a highly advantageous and heretofore unseen way and which provides still further advantages.

REFERENCES

1. K. Slocum et al., "Dispersion Compensators," Wit SoundView Corp. Report, May 29, 2001.
2. J. Jungjohann et al., "Will Dispersion Kill Next Generation 40 Gigabit Networks?" CIBC World Markets Equity Research, Jun. 19, 2001.
3. R. Kazarinov et al., "All-Pass Optical Filters," U.S. Pat. No. 6,289,151 B1, issued Sep. 11, 2001.
4. G. Lenz et al., "Optical Communication System including Broadband All-Pass Filter for Dispersion Compensation," U.S. Pat. No. 6,259, 847 B1, issued Jul. 10, 2001.
5. C. K. Madsen et al., "Integrated Optical Allpass Filters for Dispersion Compensation," OSA TOPS vol. 29, *WDM Components*, pp. 142–149.
6. G. Lenz et al., "Optical Filter Dispersion in WDM Systems: A Review," OSA TOPS vol. 29, *WDM Components*, pp. 246–253.
7. J. Ip, "Chromatic Dispersion Compensation Device," U.S. Pat. No. 5,557,468, issued Sep. 17, 1996.
8. M. Jablonski et al., "The Realization of All-Pass Filters for Third-Order Dispersion Compensation in Ultrafast Optical Fiber Transmission Systems," *Journal of Lightwave Technology*, vol. 19, no. 8, pp. 1194–1205, August 2001.

SUMMARY OF THE INVENTION

As will be disclosed in more detail hereinafter, there is disclosed herein an optical device for receiving input light and for acting on the input light to produce output light. The optical device includes a first reflector and a second reflector supported in a spaced-apart, confronting relationship with the first reflector such that the input light received by the optical device, at least potentially, undergoes multiple reflections between the first and second reflectors. At least a selected one of the first and second reflectors is configured to subject each one of a plurality of different portions of the input light to one of a plurality of different reflectance values to produce an emitted light passing through at least the selected reflector in a way which is combinable to generate the output light.

In another aspect of the invention, there is disclosed a dispersion compensation module including the afore-described optical device.

In still another aspect of the invention, a method for use in an optical device for receiving input light and for acting on the input light to produce output light is disclosed. The method includes the steps of supporting a first reflector and a second reflector in a spaced-apart, confronting relationship and configuring the first and second reflectors such that the input light received by the optical device, at least potentially, undergoes multiple reflections between the first and second reflectors. The method also includes the step of configuring at least a selected one of the reflectors to include a plurality of different reflectance values. The method further includes the step of subjecting a plurality of different portions of the input light, during the multiple reflections, to a plurality of different reflectance values at a selected one of the reflectors to produce an emitted light passing through the selected reflector in a way which is combinable to generate the output light.

BRIEF DESCRIPTION OF THE DRAWINGS

The present invention may be understood by reference to the following detailed description taken in conjunction with the drawings briefly described below.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

As mentioned in the above Background section, the single stage Fabry-Perot (FP) filter is not able to provide a smooth phase response profile over a range of wavelengths because the FP filter provides an output in the form of a series of Gaussian peaks. Although several FP filters (or equivalents thereof, such as the CCAP filters) may be cascaded together, the fabrication and alignment tolerances required in forming such a cascaded device is submitted to makes the device impractical. In contrast, the present invention achieves remarkable advantages by providing an effect equivalent to the cascaded interference filter device using only a single cavity.

Figure 1A:
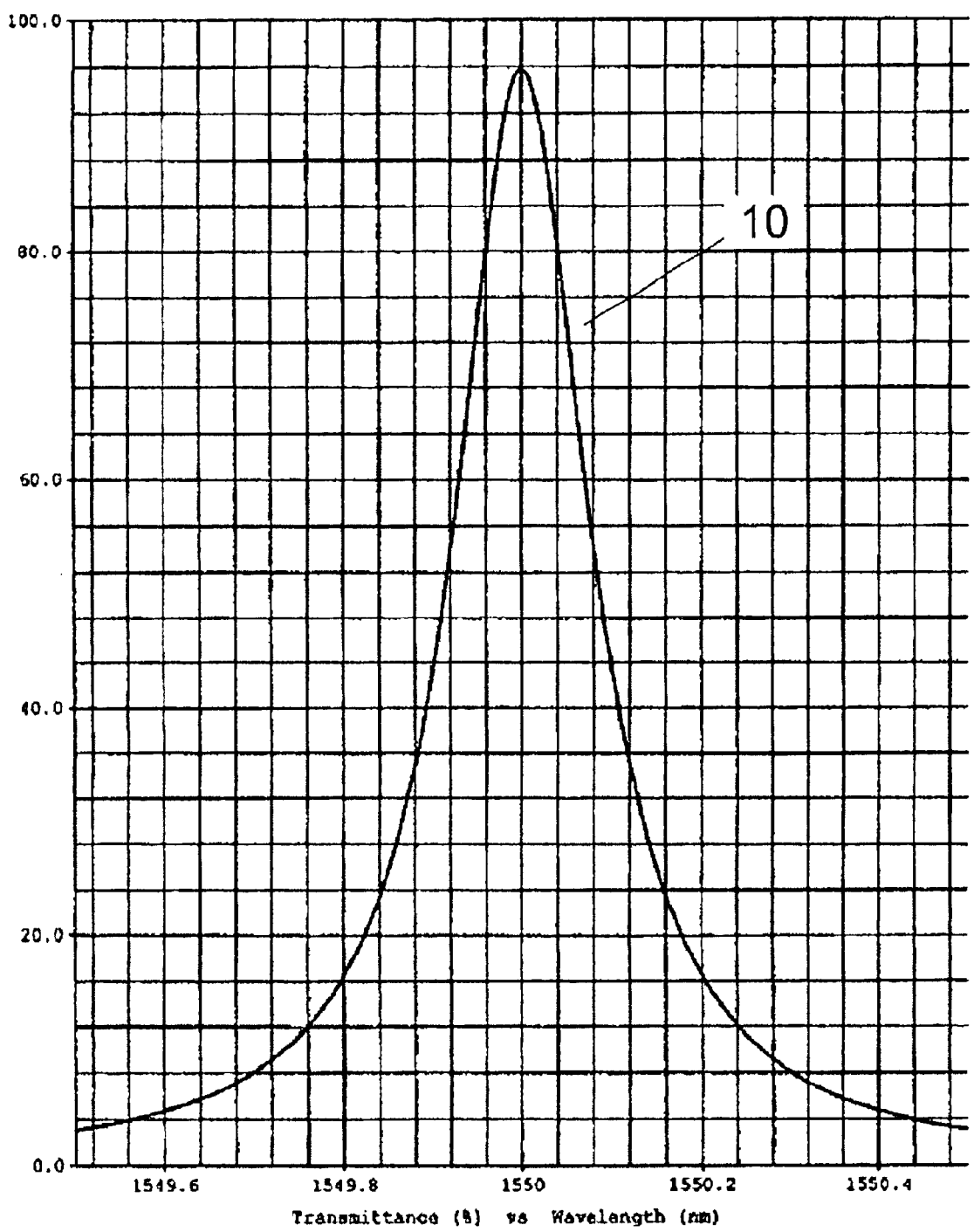
FIG. 1A is a computer generated graph of a transmittance peak of a single cavity Fabry-Perot filter having opposing reflectors, each of which includes a uniform reflectance value.
Figure 1B:
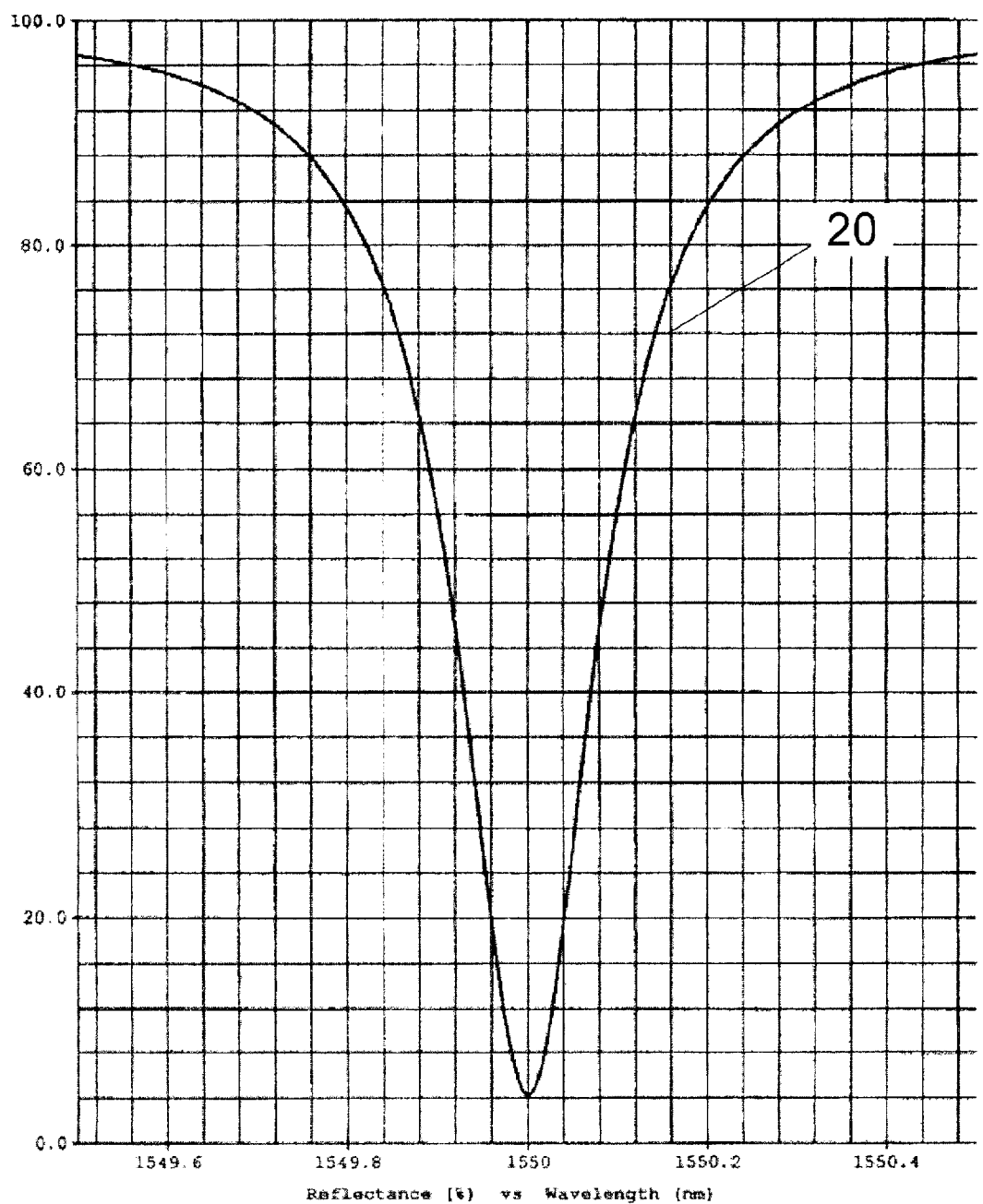
FIG. 1B is a computer generated graph of a reflectance trough of the single cavity Fabry-Perot filter shown in FIG. 1A.

The optical device of the present invention is based on the single cavity FP configuration. Turning now to the drawings, wherein like components are indicated by like reference numbers throughout the various figures where possible, attention is immediately directed to FIGS. 1A–1B, serving as a foundation and framework in understanding the teachings of the present invention and its associated advantages. In FIG. 1A, a transmittance peak 10 of a single cavity FP filter is shown. As mentioned above, the transmittance peak is Gaussian in shape. A corresponding reflectance trough 20 is shown in FIG. 1B (In a Gires-Tournois configuration, the transmittance and reflectance curves would be added together to provide an ideal total output of 100%). Transmittance peak 10 of FIG. 1A and reflectance trough 20 of FIG. 1B are mirror images of one another, assuming the absence of absorption in the FP filter.

Figure 1C:
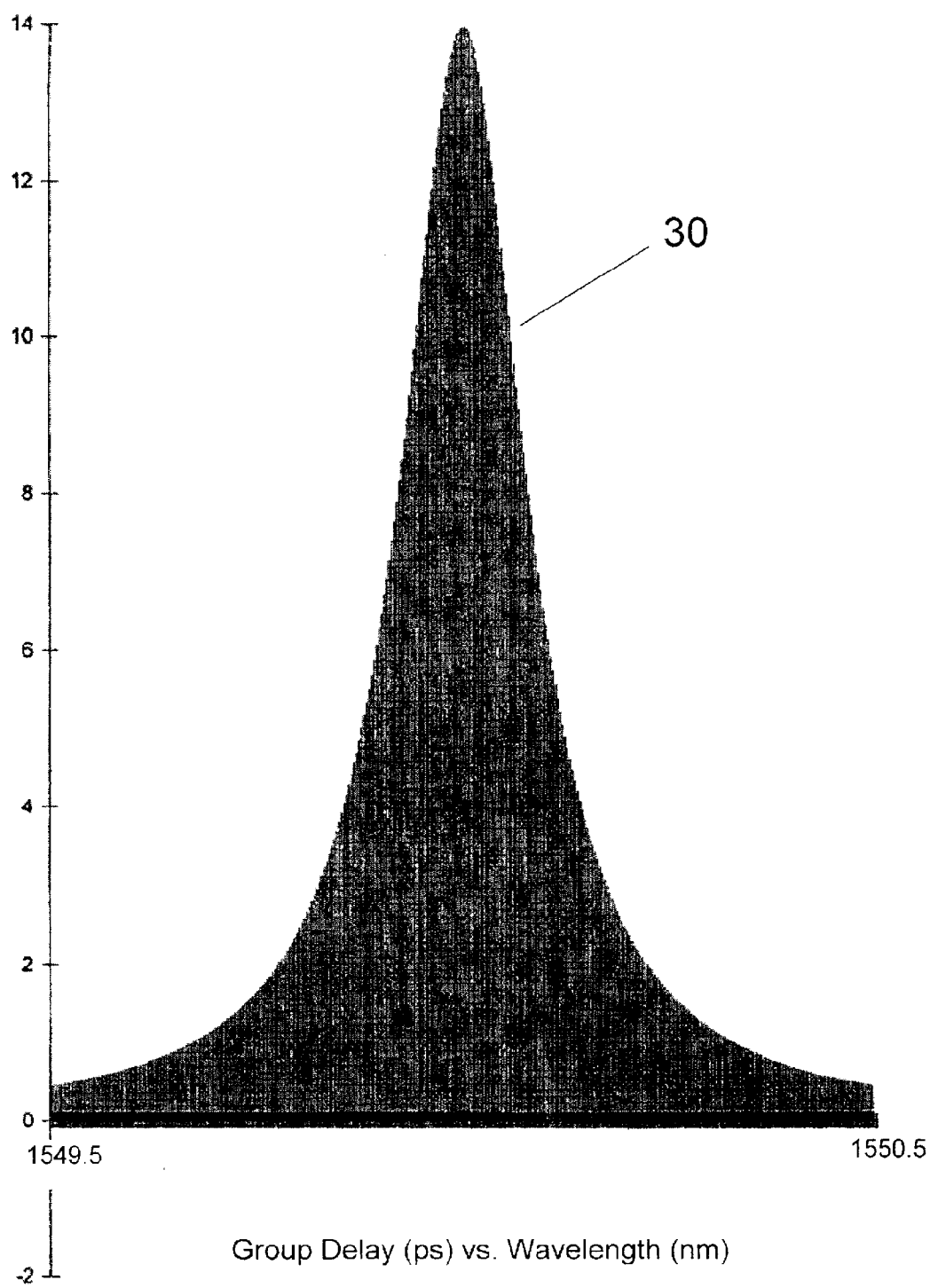
FIG. 1C is a computer generated graph of a group delay peak corresponding to the transmittance peak of the single cavity Fabry-Perot filter shown in FIG. 1A.
Figure 1D:
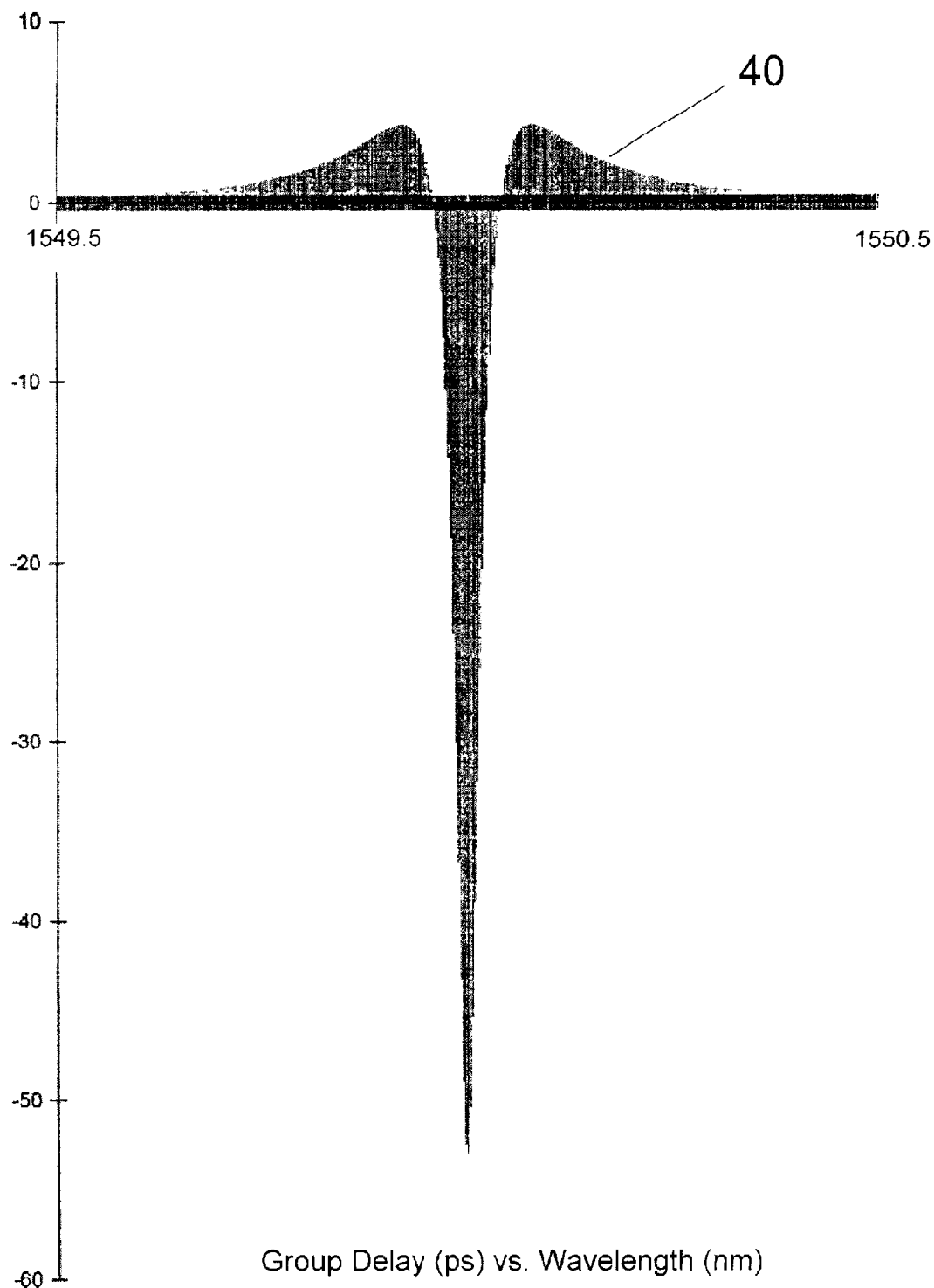
FIG. 1D is a computer generated graph of a group delay peak corresponding to the reflectance trough of the single cavity Fabry-Perot filter shown in FIG. 1B.

The corresponding phase response (i.e., group delay vs. wavelength) in transmission and reflection are shown in FIGS. 1C and 1D, respectively. Like the transmittance peak shown in FIG. 1A, phase response peak 30 shown in FIG. 1C is essentially Gaussian in shape. Although phase response peak 40 shown in FIG. 1D appears to have a negative value surrounding the center of the peak, the discontinuity in the peak shape is merely a computational artifact, and the actual phase response peak is a positive peak. Comparing the phase response in transmission and reflection, it can be noted that the transmitted phase and the reflected phase are not mirror images of each other. In fact, the phase response is a positive phase delay for both transmitted and reflected light. It is further noted that the general shape of the phase response peak in both the transmitted and reflected light "follows" the shape of the transmittance peak.

It is recognized in the context of the present invention that this correspondence between the transmittance peak shape and the phase response is significant because this correspondence implies that, by manipulating the shape of the transmittance peak of the single cavity FP device, the shape of the phase response of the device can also be customized. In other words, when the FP configuration is used as a transmission device or as an all-pass Gires-Tournois filter, it is recognized herein that the phase response of the device corresponds in shape to the transmittance profile of the device. Therefore, the phase response of the device may be tailored by altering the transmittance profile.

Chromatic dispersion can be defined as the first order derivative of the phase response as a function of wavelength. Therefore, it is further recognized that the chromatic dispersion characteristics of the device may consequently be manipulated by changing the transmission characteristics, and thereby the phase response, of the device. For example, to achieve a ripple-free chromatic dispersion profile, the group delay as a function of wavelength should be a straight line. If the slope of the phase response is linear and positive, the device would exhibit a constant positive chromatic dispersion. Similarly, if the slope of the phase response is negative, the device would yield a constant negative chromatic dispersion.

It is important to appreciate that the transmittance profile of an FP device may be manipulated in a number of ways. For example, the reflectivity of the reflectors which define the cavity may be increased or decreased to change the shape and periodicity of the transmittance peaks. Also, the cavity length (or the distance between the reflectors) may be altered. By mathematical calculations, it can be shown that, for a given reflectivity, increased cavity length leads to reduced spacing between the transmittance peaks and increased group delay experienced by transmitted and reflected light. Also, for a given cavity length, increased mirror reflectivity leads to sharper transmittance peaks and increased group delay experienced by transmitted and reflected light. Any suitable method of altering the transmittance profile of a Fabry-Perot device in order to manipulate the phase response of the device, some of which methods are described herein, is considered to fall within the scope of the present invention.

Any linear function, such as a desired linear group delay function, is represented by a straight line. In general, this straight line can be broken down into a staircase function such that integration of the staircase function, at least to an approximation, yields the straight line. A sawtooth function, for example, can be considered a series of staircase functions. As described above, a single cavity FP filter exhibits a transmittance profile consisting of a series of discrete peaks. Clearly, these peaks, one of which is seen in FIG. 1A, are not representative of a staircase or sawtooth function. Applicants have recognized, however, that manipulation and adding of such discrete functions yet to be described may be used to attain, for example, a sawtooth function. Remarkably, a substantially linear transmittance profile, and thereby a linear phase response, can be achieved using an FP device by adding the transmittance peaks in such a way that the total, overall transmittance function is in the form of a staircase or sawtooth function.

It is further recognized herein that it is possible achieve this substantially linear transmittance profile by designing at least one of the reflectors forming the cavity to include a gradient reflectance profile. In other words, one of the reflectors is configured to have two or more reflectance regions with different reflectance values. When light is incident on such a single cavity FP device including a gradient reflector, different portions of the incident light encounter different reflectance regions. Consequently, the incident light encounters different interference conditions within the FP device, depending on which of the different reflectance regions on which the light is incident, and, consequently, light emanating from the different reflectance regions interfere to result in an output light. If, for example, each reflectance region is designed such that the resulting peaks in the transmittance profile of that reflectance region are offset with respect to the peaks in the transmittance profiles of other reflectance regions, then it the aforedescribed staircase or sawtooth function is achieved using only a single cavity FP device with such a gradient reflector. The single cavity FP device with the gradient reflector of the present invention is referred to as an gradient FP device hereinafter.

Figure 2A:
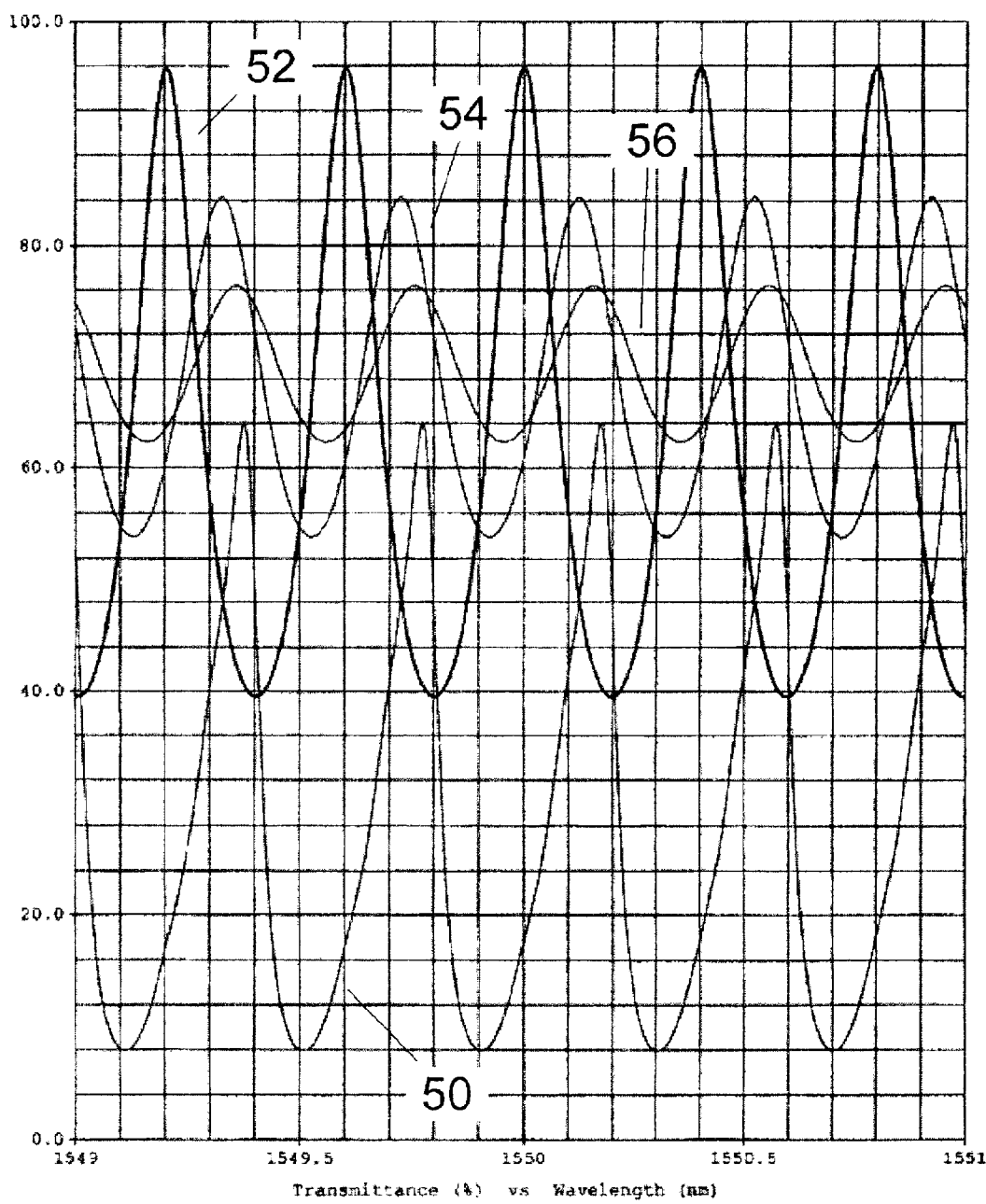
FIG. 2A is a computer generated graph of the composite transmittance profile of a single cavity Fabry-Perot device including a gradient reflector of the present invention, shown here to illustrate the composite transmittance of a including three reflectance regions.
Figure 2B:
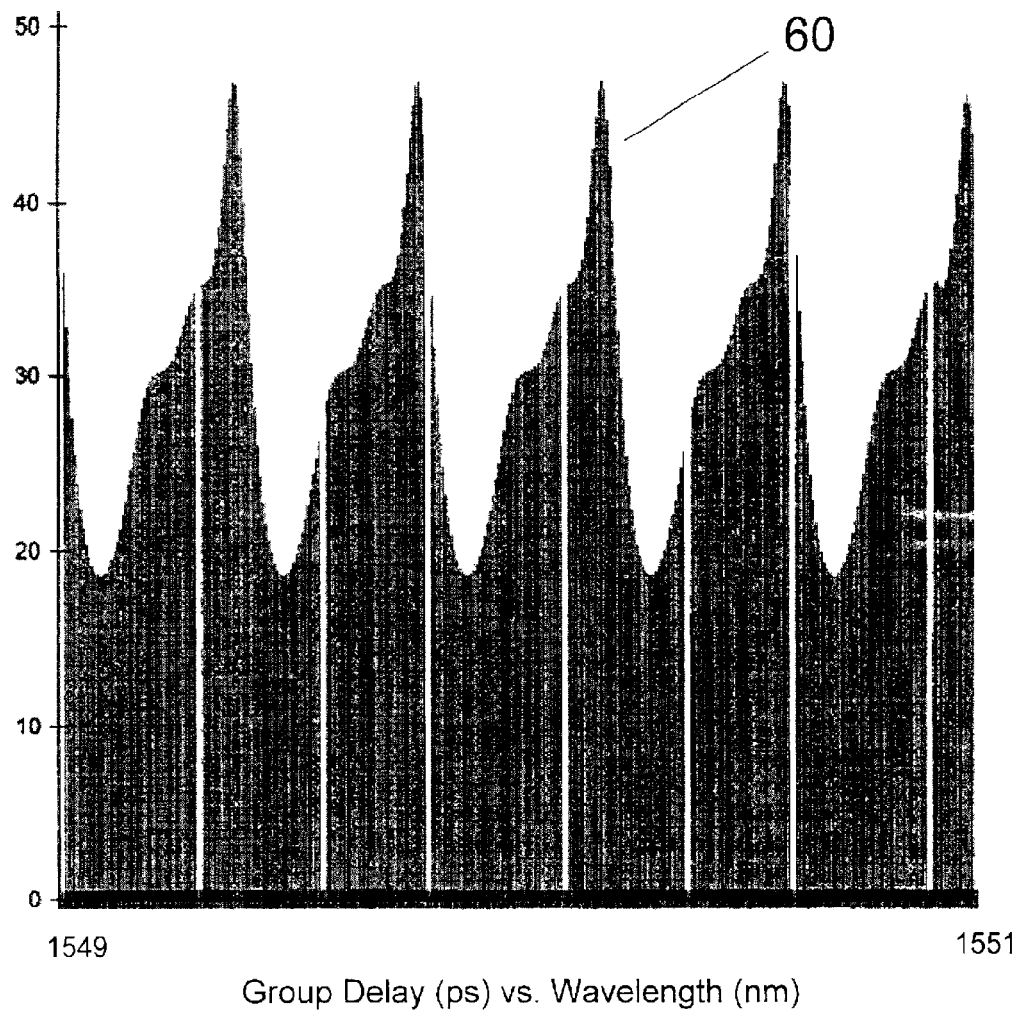
FIG. 2B is a computer generated graph of a group delay profile corresponding to the transmittance profile of the single cavity Fabry-Perot device including the gradient reflector shown in FIG. 2A.

To illustrate the above concept of tailoring the phase response of the single cavity FP device by manipulating the transmittance profile of the device, attention is directed to FIGS. 2A and 2B. FIG. 2A shows a composite transmittance profile 50 of an gradient FP device with three reflectance regions. The reflectance regions yield transmittance profiles 52, 54 and 56, respectively, such that composite transmittance profile 50 is essentially a sawtooth function with a positive slope. In other words, by combining the transmittance profiles of the three reflectance regions of this FP gradient device, a composite transmittance profile in the form of a sawtooth function is achieved. FIG. 2B shows a phase response (group delay vs. wavelength) profile 60 corresponding to composite transmittance profile 50 of FIG. 2A. Like composite transmittance profile 50 of FIG. 2A, phase response profile 60 resembles a sawtooth function with substantially similar periodicity. That is, as asserted earlier, FIG. 2B demonstrates that the phase response of the gradient FP device "follows" the transmittance profile of that device such that, by altering the transmittance profile, the phase response of the device may be tailored as desired.

Figure 3A:
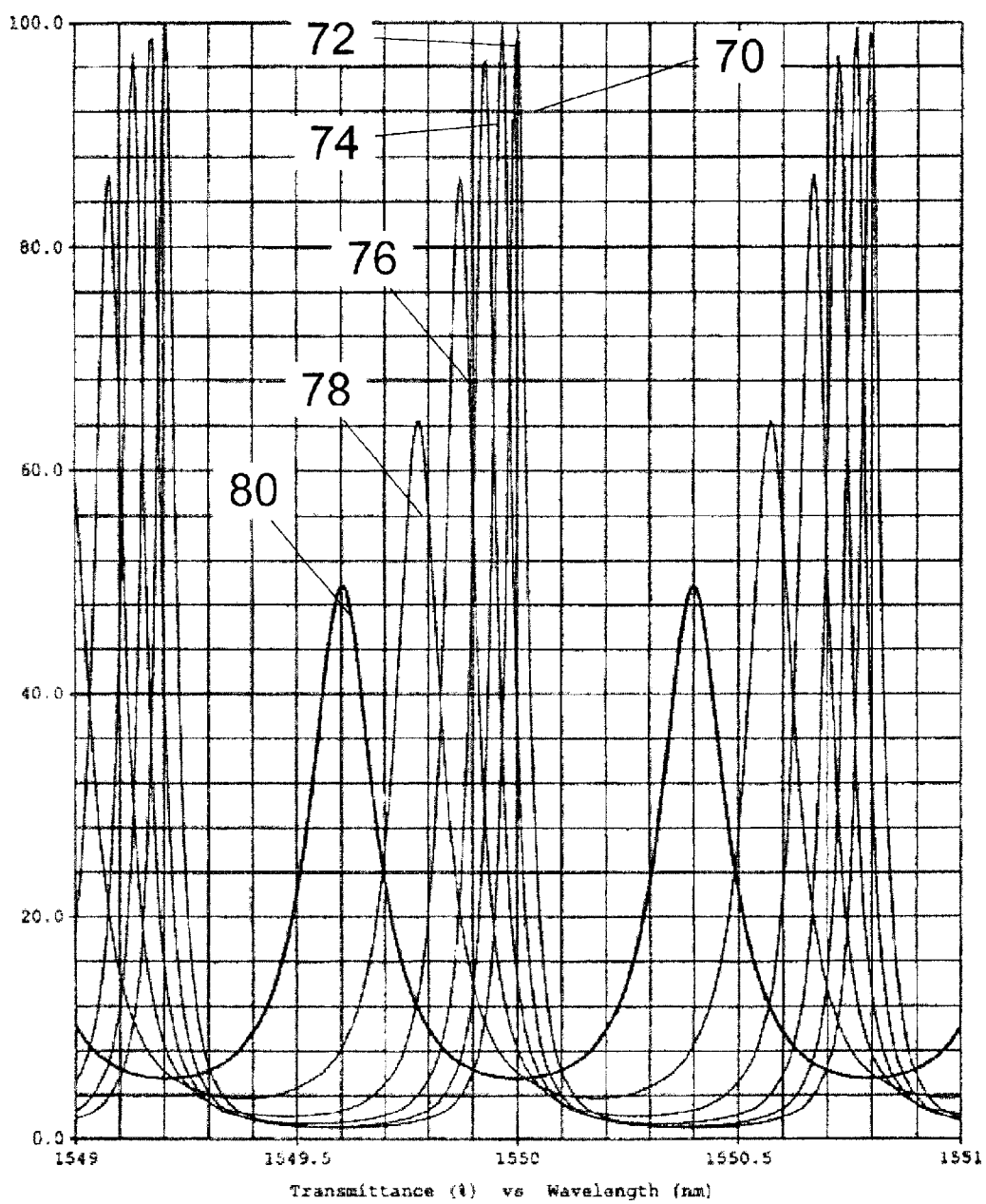
FIG. 3A is a composite of the computer generated graphs of the transmittance profile of each of six reflectance regions of a single cavity Fabry-Perot device including a gradient reflector with six reflectance regions, shown here to illustrate the composition of a sawtooth function with a positive slope transmittance profile.

As a further example, a gradient FP device with six reflectance regions in one of the reflectors is described. The transmittance peaks from each of the six reflectance regions are overlaid in a composite graph shown in FIG. 3A. The transmittance profiles in FIG. 3A have been calculated assuming that the reflectance regions are formed of quarterwave stacks, wherein one of the layers in one of the reflecting stacks is reduced in optical thickness from one quarterwave to 0.8, 0.6, 0.4, 0.2 and 0 quarterwave at a design wavelength of 1550 nm (shown as curves 70, 72, 74, 76, 78 and 80, respectively). That is, the reflecting stack exhibits different reflectance values depending on the thickness of the altered layer, thereby producing different transmittance profiles at the reflectance regions. As indicated in FIG. 3A, the transmission peaks decrease in transmitted amplitude and increase in peak full width half maximum (FWHM) values while the center wavelength of the peaks move progressively to shorter wavelengths as the altered layer thickness is reduced. When the transmittance profiles from the six reflectance regions are added together, they cooperate to yield a sawtooth function in the total transmittance. Accordingly, the total group delay profile will be a corresponding sawtooth function, resulting in a positive value of chromatic dispersion.

Figure 3B:
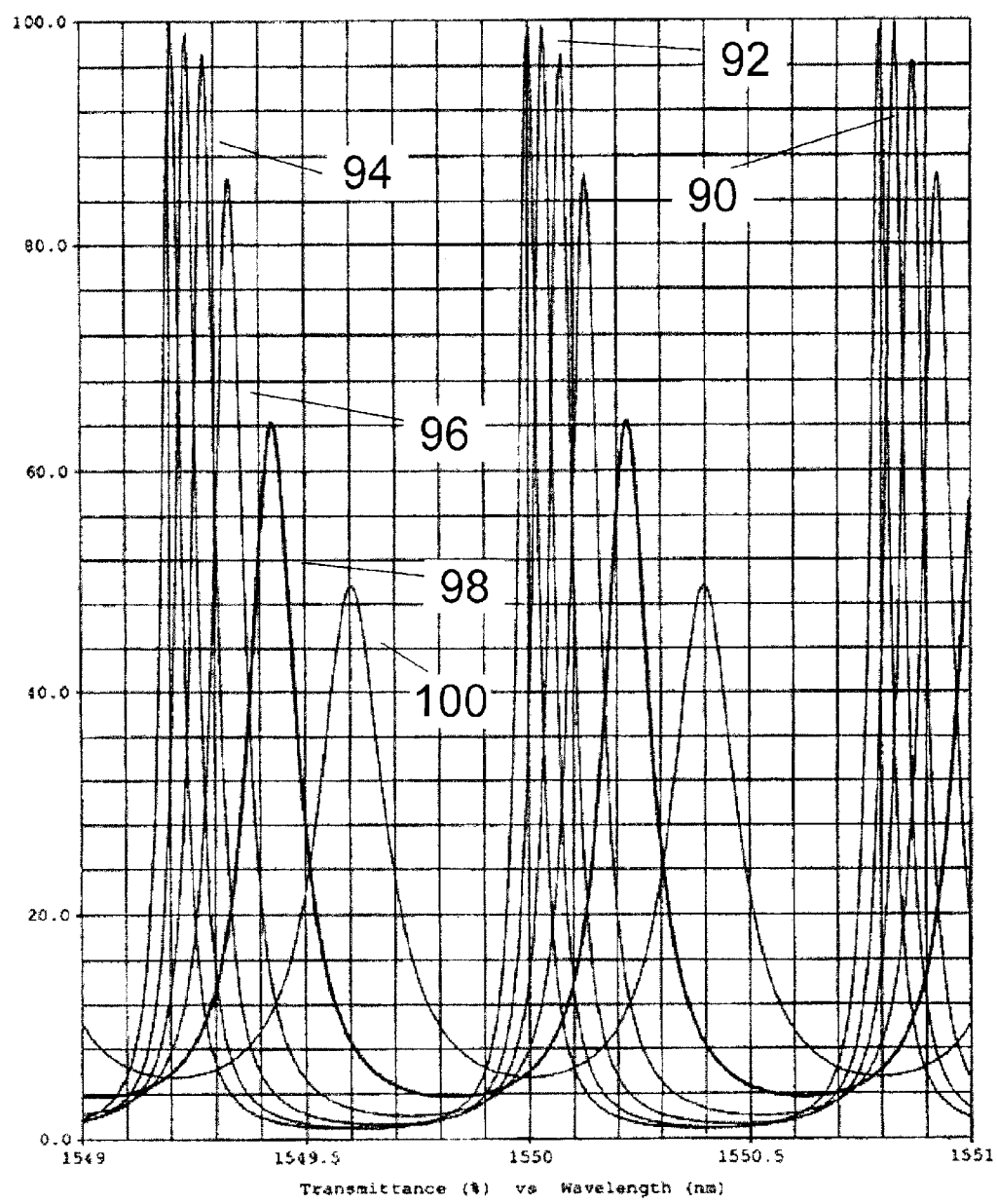
FIG. 3B is a composite of the computer generated graphs of the transmittance profile of each of six reflectance regions of another single cavity Fabry-Perot device including a gradient reflector with six reflectance regions, shown here to illustrate the composition of a sawtooth function with a negative slope transmittance profile.

An alternative example is shown in FIG. 3B, illustrating the overlaid transmittance peaks from six reflectance regions of an gradient FP device in which one of the layers in one of the reflecting stacks is increased in optical thickness from one quarterwave to 1.2, 1.4, 1.6, 1.8 and 2.0 quarterwave at the design wavelength of 1550 nm (shown as curves 90, 92, 94, 96, 98 and 100, respectively). Again, the reflecting stack exhibits different reflectance values depending on the thickness of the altered layer such that, in this case shown in FIG. 3B, the center wavelength of the transmission peaks move progressively to longer wavelengths as the altered layer thickness is increased. The transmittance peaks also decrease in transmitted amplitude and increase in peak FWHM values as the layer thickness is increased. Consequently, when the transmittance peaks from the six reflectance regions are combined, the total transmittance profile is a sawtooth function, and the corresponding total group delay profile will also be a sawtooth function, this time resulting in a negative chromatic dispersion.

Figure 3C:
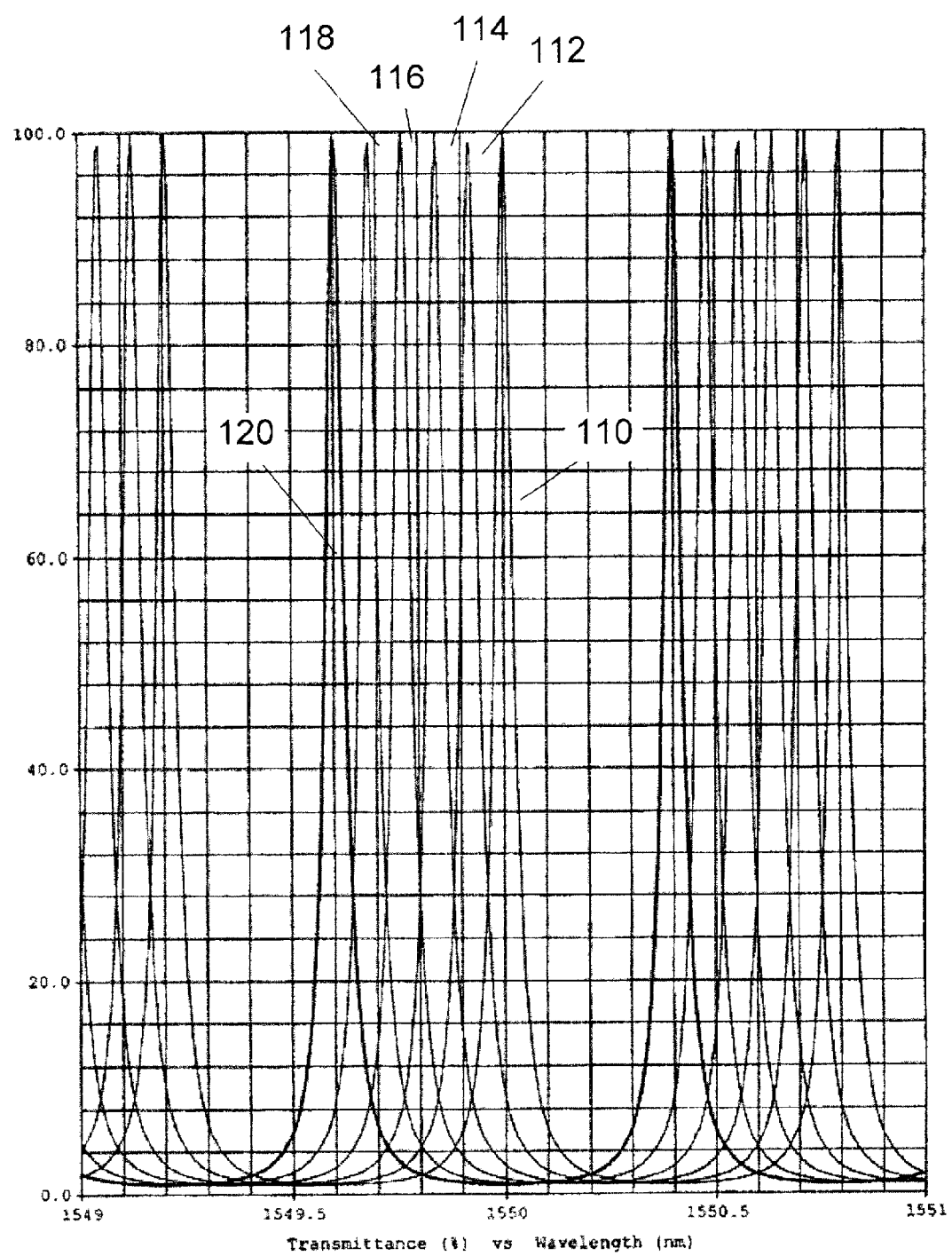
FIG. 3C is a composite of the computer generated graphs of the transmittance profile of each of six etalon thickness regions of a single cavity Fabry-Perot device including an etalon with six thickness regions, shown here to illustrate the absence of slope variation in the transmittance profile.

It is notable that the tailoring of the transmittance profile, and thereby the group delay profile, in the aforedescribed manner involves the manipulation of the amplitude as well as the position of the center wavelength of the transmittance peaks. For instance, the center wavelength positions of the transmittance peaks may be altered, for example, by changing the thickness of the etalon portion of a Fabry-Perot device (e.g., by using a wedge shaped etalon) without changing the reflectance of the reflectors. The computer generated transmittance profiles of a single cavity Fabry-Perot device with six etalon thickness regions are shown in FIG. 3C. Curves 110, 112, 114, 116, 118 and 120 are calculated transmittance profiles of this device as the etalon thickness is reduced by increments of 0.2 quarterwaves at the design wavelength of 1550 nm, respectively, while the reflectance values of the reflectors in the device are kept constant. As can be seen in FIG. 3C, although the peak position moves toward shorter wavelengths as the etalon thickness is reduced, the peak amplitudes and the FWHM values do not change. Therefore, the total transmittance profile will not be a sawtooth function, and the resulting device would not affect chromatic dispersion.

Figure 4A:
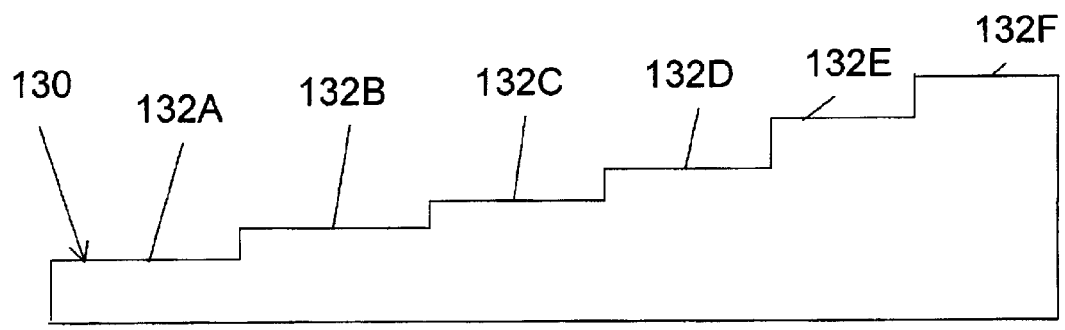
FIG. 4A is a schematic diagram of a gradient reflector with a step function reflectance profile.
Figure 4B:
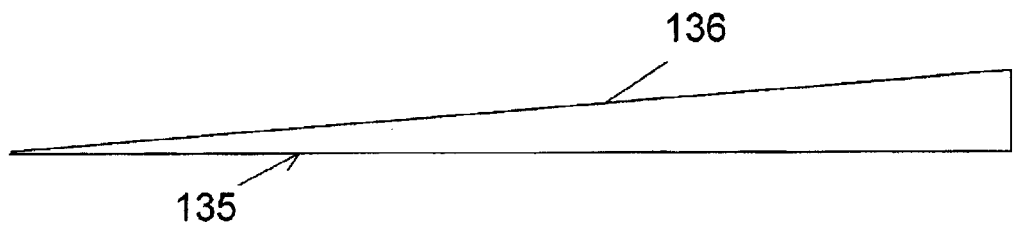
FIG. 4B is a schematic diagram of a gradient reflector with a continuous wedge reflectance profile.
Figure 4C:
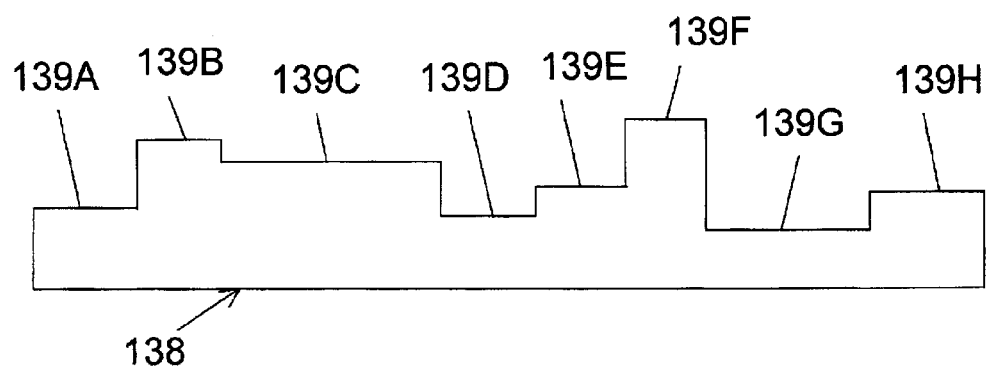
FIG. 4C is a schematic diagram of a gradient reflector with a non-uniform step reflectance profile.
Figure 4D:
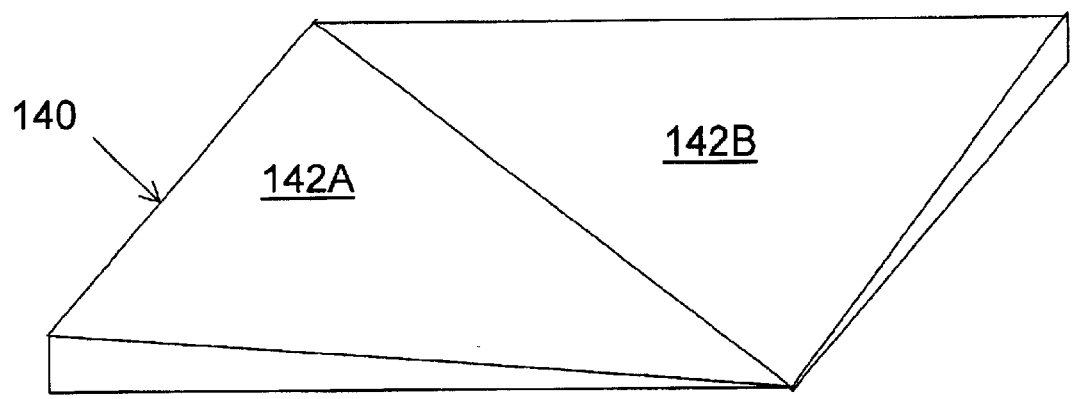
FIG. 4D is a schematic diagram of a gradient reflector with a reflectance profile which varies along two dimensions of the reflector.
Figure 4E:
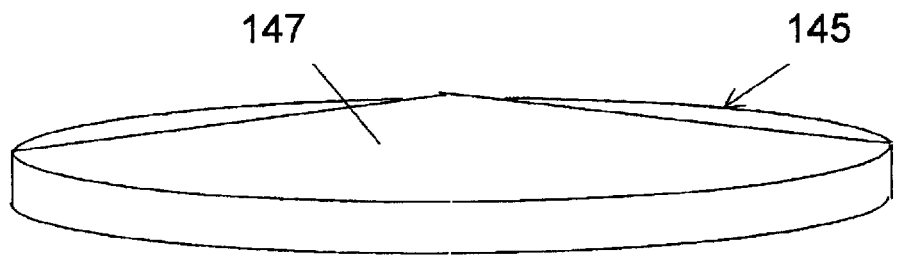
FIG. 4E is a schematic diagram of a circular gradient reflector with a radially-varying reflectance profile.
Figure 4F:
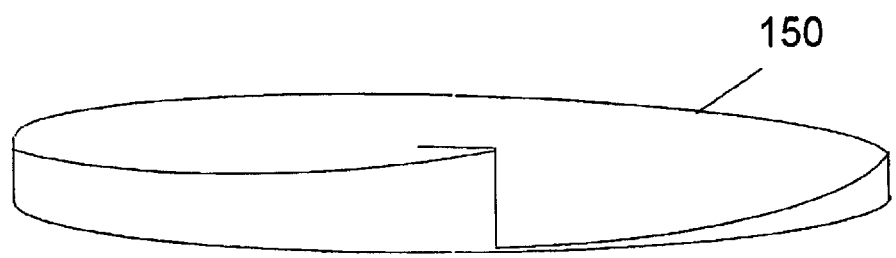
FIG. 4F is a schematic diagram of a circular gradient reflector with a reflectance profile which varies around the circumference of the reflector.

FIGS. 4A–4G illustrate several possible gradient reflector configurations and a possible Fabry-Perot configuration. As shown in FIG. 4A by a reflector 130, the gradient reflector may include a number of discrete reflectance regions 132A–132F in which, for example, the reflectance values increase or decrease in a stepwise fashion. Alternatively, as shown by a reflector 135 in FIG. 4B, the gradient reflector may be formed with a continuous wedge profile by using a sloped surface 136 such that the reflectance values vary smoothly or continuously across the gradient reflector. Although reflector 135 is shown having a linear wedge profile, the gradient reflector of the present invention can also have a continuous, non-linear wedge profile to provide the desired transmittance profile. The gradient reflector can also be in the form of a step profile with non-uniform steps, as shown by a reflector 138 in FIG. 4C, including a number of surfaces indicated as 139A–139K, designed to yield a desired transmittance profile, and thereby a desired group delay profile and chromatic dispersion response. Furthermore, the reflectance values may be varied along two dimensions of the reflector. For example, as illustrated by a reflector 140 in FIG. 4D, the reflectance values may be graded along two orthogonal directions of the reflector such that reflector 140 includes two sloped surfaces 142A and 142B. Similarly, as shown in FIGS. 4E and 4F, the reflectance value can vary radially, as in a circular reflector 145 of FIG. 4E, or around the circumference, as in a circular reflector 150 of FIG. 4F. The various reflectance regions may be formed, for instance, by lithography during the coating process in the manufacture of the reflector as a quarterwave stack. The gradient reflector, for example, may be formed of one or more layers of a metallic, dielectric or semiconductor material. For instance, the gradient reflector may include a plurality of layers divided into regions having a plurality of different reflectance values.

Figure 4G:
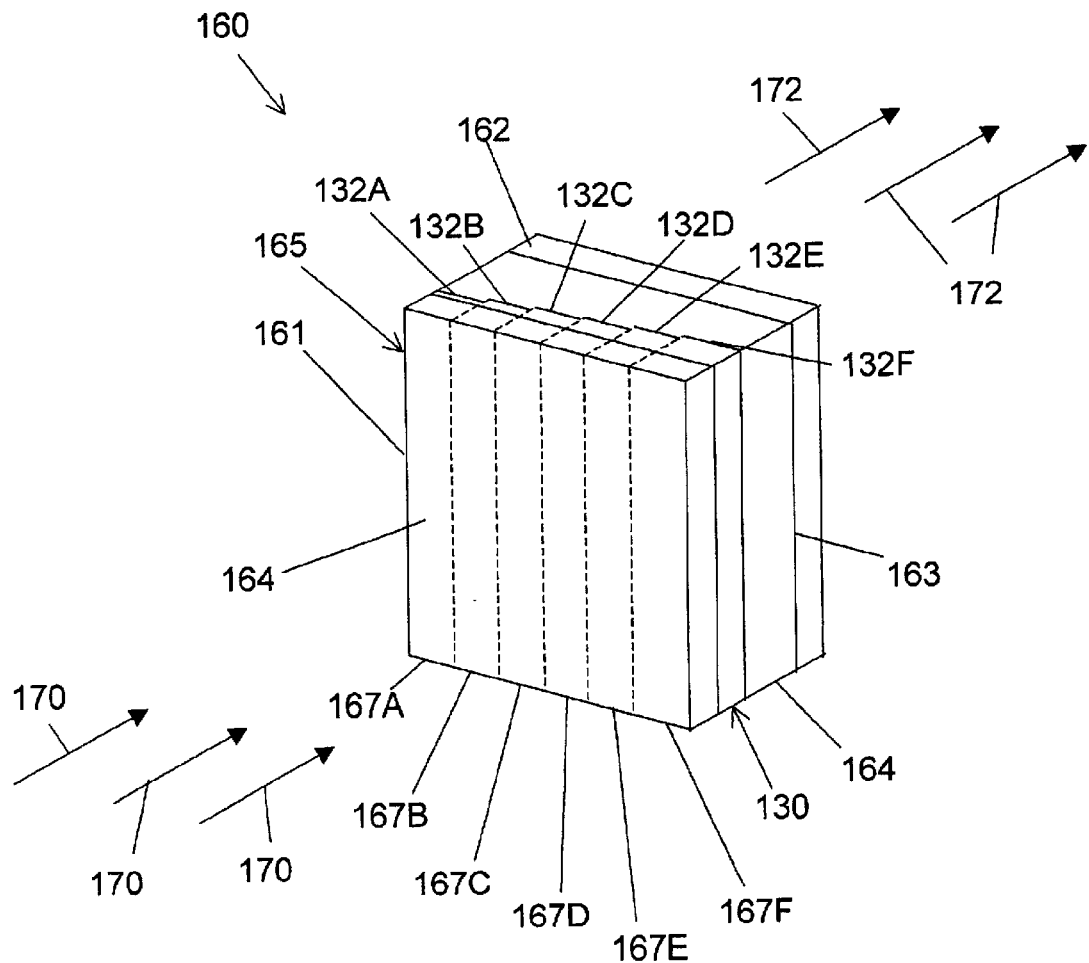
FIG. 4G is a schematic diagram of a single cavity Fabry-Perot device with a gradient reflector of the present invention, shown here to illustrate a possible device configuration including the gradient reflector with the step function reflectance profile of FIG. 4A.

Referring now to FIG. 4G in conjunction with FIG. 4A, an example of a single cavity FP device including a gradient reflector is illustrated in FIG. 4G. An gradient FP device 160, as shown in FIG. 4G, includes first and second substrates 161 and 162, respectively, separated by an etalon layer 164. Second substrate 162 includes a reflective surface 163 having a predetermined, fixed reflectance value. A front face 164 of first substrate 161 effectively acts as an aperture, which determines the maximum diameter (and thereby amount) of an incident light beam accepted by gradient FP device 160. An additional aperture or iris (not shown) may be positioned in front of front face 164 for further controlling the amount of an incident light beam that strikes the gradient FP device. Reflector 130 of FIG. 4A is mounted on first substrate 161 to form a gradient reflector arrangement 165. Due to the different values of reflectivity displayed by discrete reflectance regions 132A–F, gradient reflector arrangement 165 is essentially divided into zones 167A–F, each zone having a different value of reflectivity. When a collimated input beam 170 is incident on gradient FP device 160, different portions of input beam 170 strike different zones 167A–F such that the different portions of the input beam experience different values of reflectivity. As a result, different portions of an output beam 172 emanating from gradient FP device 160 exhibit different transmittance profiles, and, when output beam 172 is focused using, for example, a lens (not shown), the transmittance profiles of the different portions of output beam 172 are combined into a total transmittance profile. In this way, by controlling the sizes and reflectivity values of zones 167A–F, the total transmittance profile, and thereby the phase response, of gradient FP device 160 can be tailored as desired. In general, the gradient FP device should be oriented such that the input beam strikes the gradient FP device at a normal angle in order to avoid introducing effects of off-normal incident angles in the total transmittance profile. However, the gradient FP device may be oriented at an off-normal angle with respect to the input beam if necessary to achieve the desired total transmittance profile and thereby phase response.

Figure 5A:
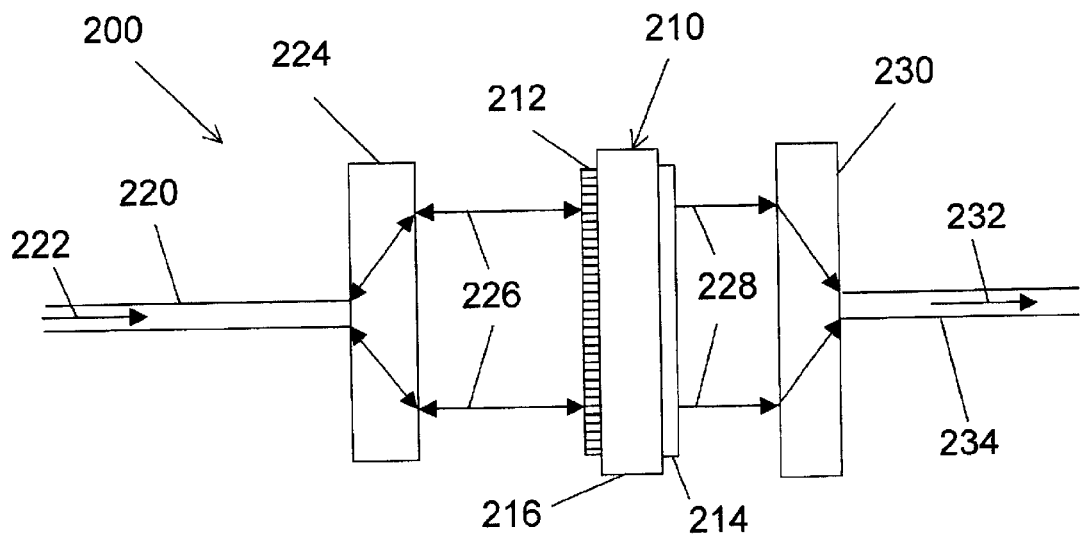
FIG. 5A is a schematic diagram of an optical configuration including the single cavity Fabry-Perot device with a gradient reflector of the present invention, the Fabry-Perot device being used as an dispersion compensator.

Referring now to FIGS. 5A–10, possible optical configurations including the gradient FP device are described in detail immediately hereinafter. FIG. 5A illustrates an arrangement 200 in which a balanced gradient FP device 210 is used as a dispersion compensator in a fiber optic system. Balanced gradient FP device 210 includes a gradient reflector 212 and a second reflector 214 separated by an etalon layer 216. Gradient reflector 212 may take the form of, for example, any of the gradient reflector configurations shown in FIGS. 4A–4F. Second reflector 214 may be, for example, a fixed or variable reflector, and the reflectivity value the second reflector and an average reflectivity value of the gradient reflector are generally similar. Arrangement 200 includes a fiber optic input 220, through which an input light 222 is inserted into arrangement 200 and a first collimator 224 for collimating input light 222 into a collimated input beam 226 to be incident on balanced gradient FP device 210. Collimated input beam 226 should be spread out and substantially collimated such that the collimated input beam encounters two or more different reflectance values of gradient reflector 212. A collimated output beam 228 from balanced gradient FP device 210 is refocused by a second collimator 230 into an output light 232, which is directed into a fiber optic output 234. Balanced gradient FP device 210 is used to introduce a predetermined phase response to input light 222 and provide output light 232 with the desired group delay (and thereby chromatic dispersion). While the light entering balanced gradient FP device 210 is shown to be collimated in FIG. 5A, the incident light does not necessarily need to be collimated. Balanced gradient FP device 210 will still provide a phase response, although the resulting output light will have a more complicated phase profile than in the case of the collimated input beam due to the blue shift experienced by light entering an interference filter at non-normal angles of incidence.

Figure 5B:
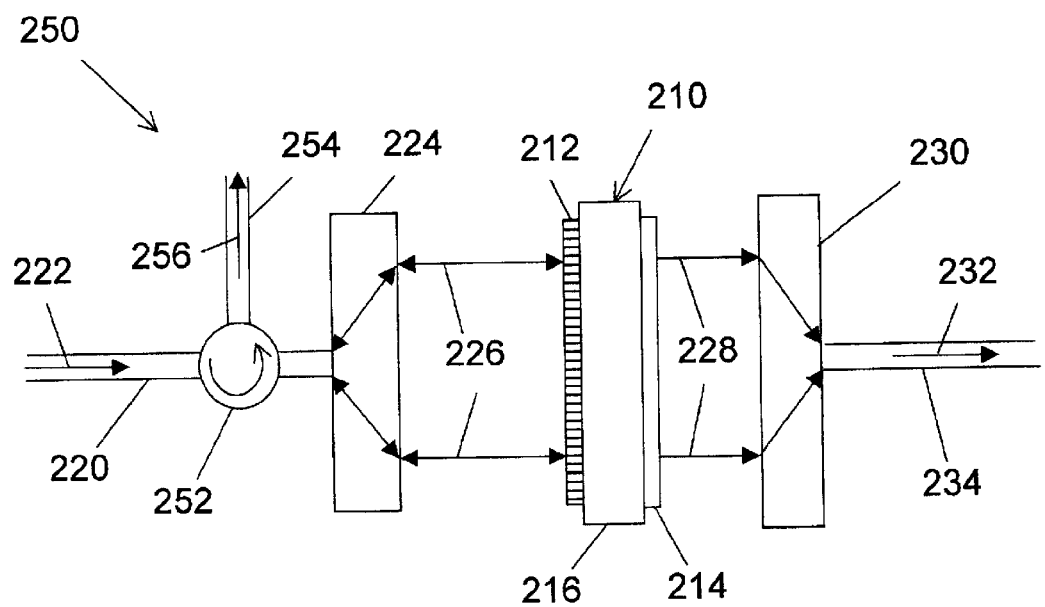
FIG. 5B is a schematic diagram of an optical configuration including a balanced single cavity Fabry-Perot device with the gradient reflector of the present invention and a circulator.

FIG. 5B illustrates an arrangement 250, which is essentially identical to arrangement 200 of FIG. 5A except that arrangement 250 includes a non-reciprocal circulator 252 with a second fiber optic output 254 for extracting a second output light 256. In this case, both the transmitted light (output light 232) and reflected light (second output light 256) from balanced gradient FP device 210 are collected, for example, by circulator 252 such that the transmitted and reflected light may be added together. In this way, balanced gradient FP device 210 may be made to act as an all-pass filter providing an amplitude response of unity, minus insertion and absorption losses. The phase response provided by balanced gradient FP device 210 of FIG. 5B is a sum of wavelength-dependent group delays experienced by the transmitted and reflected light.

Figure 6A:
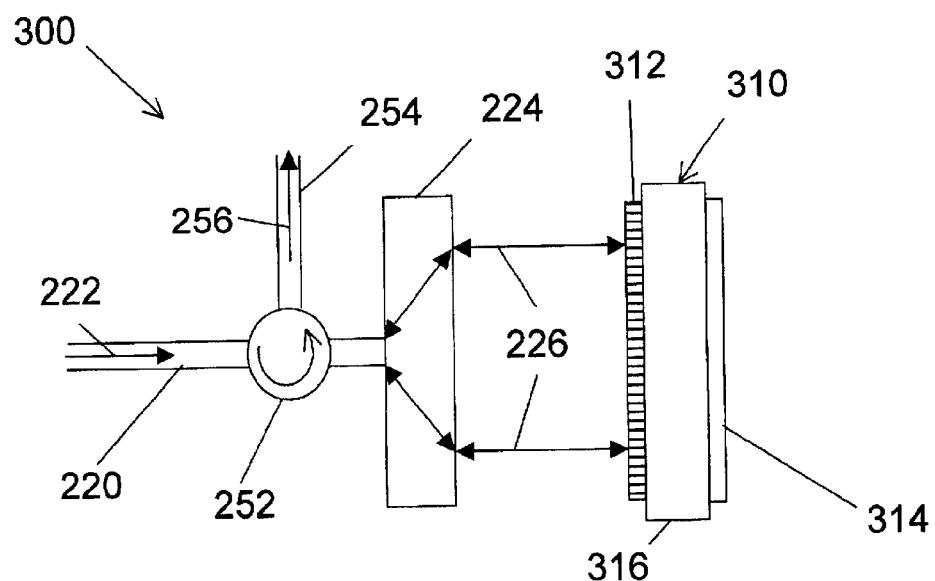
FIG. 6A is a schematic diagram of an optical configuration including an unbalanced single cavity Fabry-Perot device with the gradient reflector of the present invention and a circulator.
Figure 6B:
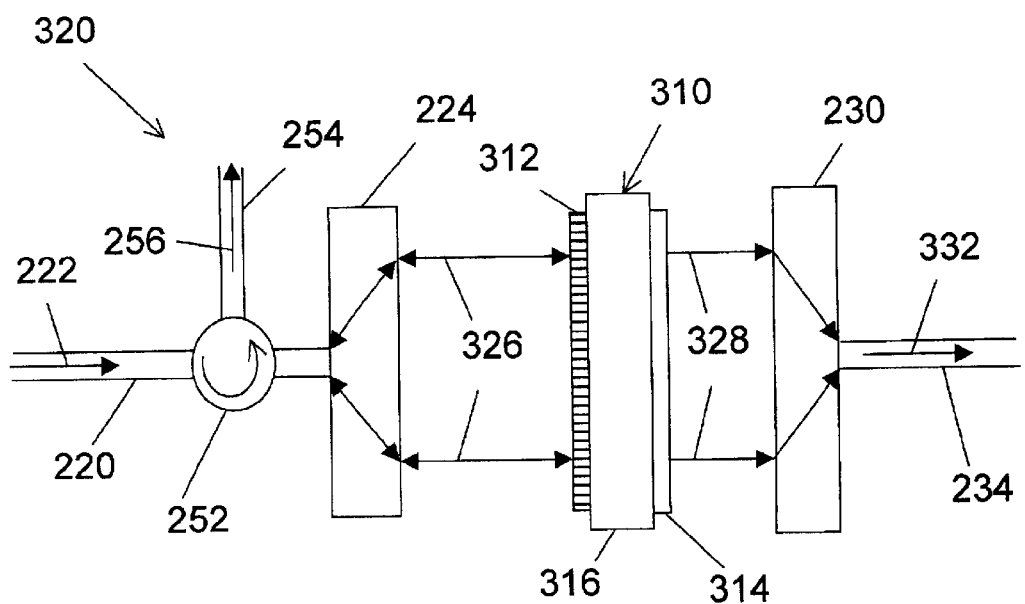
FIG. 6B is schematic diagram of an optical configuration including an unbalanced single cavity Fabry-Perot device with the gradient reflector of the present invention, a high reflector and a circulator to provide a signal output as well as an additional monitoring output.

FIGS. 6A and 6B illustrate arrangements 300 and 320, respectively, which include an unbalanced gradient FP device 310. Unbalanced gradient FP device 310 includes a gradient reflector 312 and a second reflector 314 separated by an etalon layer 316. The reflectance value of second reflector 314 in this case is significantly higher than the reflectance values inherent in gradient reflector 312. As a result, second reflector 314 reflects substantially all of the light incident on unbalanced gradient FP device 310, after at least a roundtrip (or potentially multiple reflections) through etalon layer 316 such that unbalanced gradient FP device 310 acts essentially as an all-pass filter with a predetermined phase response, which is dependent on the reflectance profile of gradient reflector 312. In arrangement 320 of FIG. 6B, most of collimated input beam 326 is reflected back toward fiber optic input 220 by second reflector 314, but a small portion 328 of the transmitted light is extracted through second reflector 314 from unbalanced gradient FP device 310. Extracted portion 328 of the transmitted light is then focused by second collimator 230 into an output light 332, which is directed into fiber optic output 234. This extracted portion 328 may be used, for example, to perform in-situ optical measurements and/or monitoring for feedback or adjustment purposes.

Figure 7:
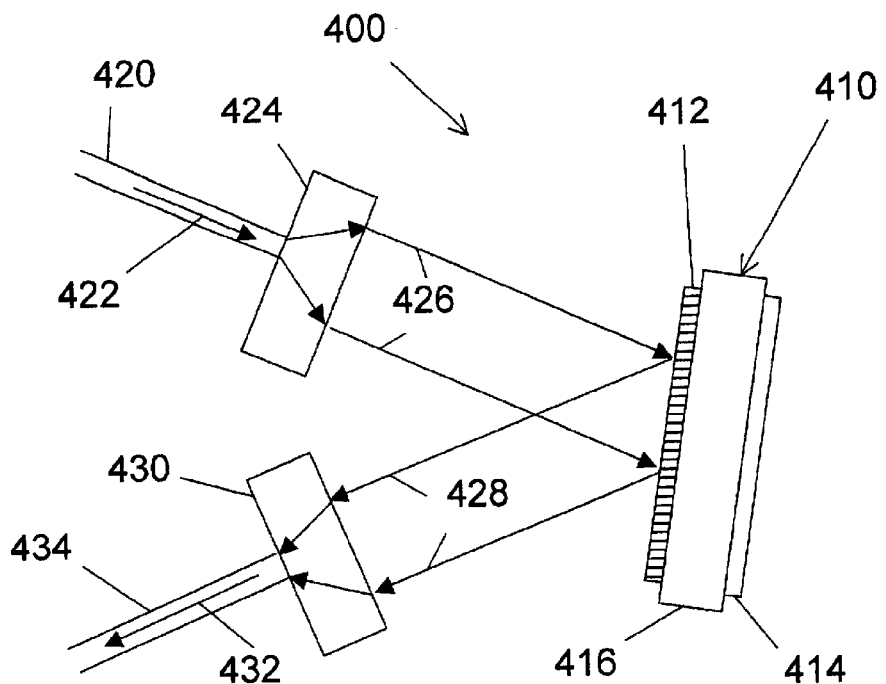
FIG. 7 is a schematic diagram of an optical configuration including a single cavity Fabry-Perot device with the gradient reflector of the present invention but without the need for the use of a circulator to provide the output.
Figure 8:
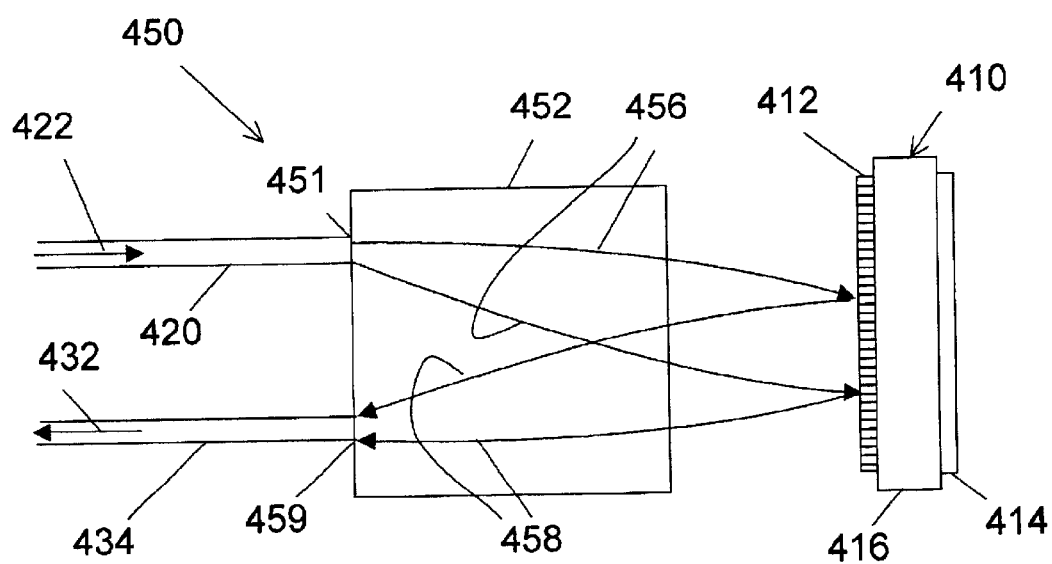
FIG. 8 is a schematic diagram of an alternative optical configuration including a single cavity Fabry-Perot device with the gradient reflector of the present invention using a GRIN lens rather than a circulator to provide the output.

FIG. 7 illustrates an alternative arrangement 400 including an gradient FP device (balanced or unbalanced) 410 with a gradient reflector 412 and a second reflector 414 separated by an etalon layer 416. Fiber optic input 420 guides an input light 422 into a first collimator 424, which produces a collimated input beam 426. Collimated input beam 426 is directed at a non-normal angle onto gradient FP device 410 such that a collimated output beam 428 produced at gradient FP device 410 emanates at another non-normal angle from the device and into a second collimator 430. In this way, the A light entering gradient FP device 410 is not collinear with the light exiting the device. Therefore, the need for a non-reciprocating circulator to extract the output from the device is eliminated, thus reducing the possibility of insertion loss from the arrangement. Collimated output beam 428 is then focused by a second collimator 430 to produce an output light 432, which is directed into a fiber optic output 434.

In another scheme to obviate the need for a circulator, a GRIN lens is used to separate the light entering and exiting the FP gradient device. An arrangement 450, shown in FIG. 8, includes gradient FP device (balanced or unbalanced) 410. Fiber optic input 420 directs input light 422 onto a first location 451 of a GRIN lens 452, which spreads out the input light to direct a substantially collimated input beam 456 onto gradient FP device 410. The device then reflects the collimated input beam incident thereon to produce a substantially collimated output beam 458, including a phase response determined by the reflectance profile of gradient reflector 412. Collimated output beam 458 travels through GRIN lens 452 to emanate at a second location 459 of GRIN lens 452 so as to be directed into fiber optic output 434 as output light 432. Again, since the input light and the output light are physically separated, the use of a non-reciprocating circulator in the arrangement is not required.

Figure 9:
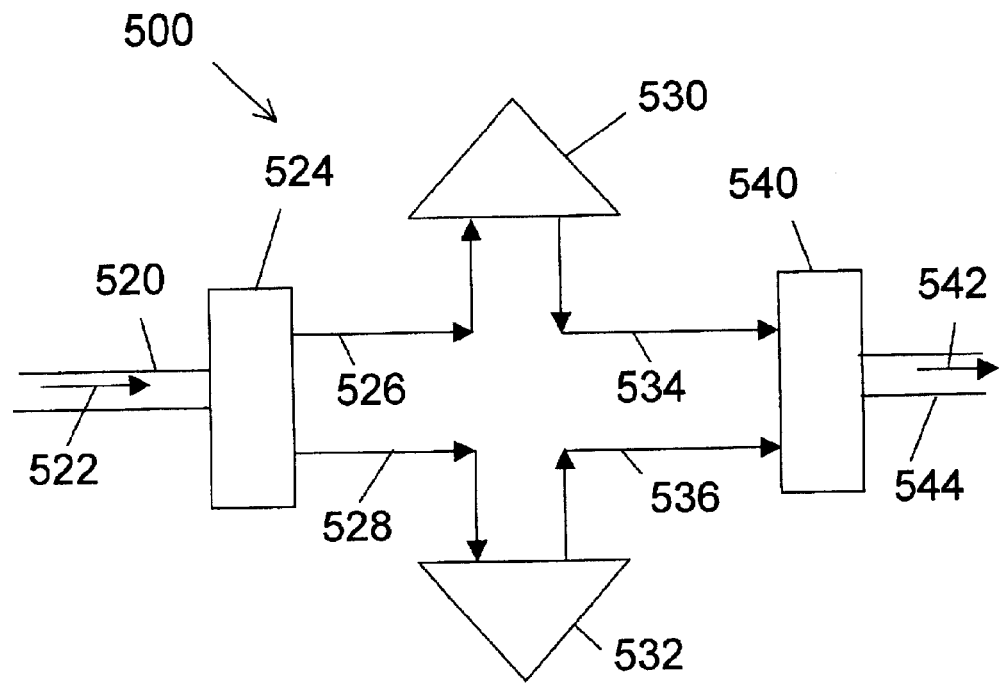
FIG. 9 is a schematic diagram of an optical configuration in which the single cavity Fabry-Perot device with the gradient reflector of the present invention may be used as a dispersion compensation module, the optical configuration including an interleaver to increase the useful flat region group delay response.

FIG. 9 illustrates an optical scheme in which an interleaver is used to increase the flat region group delay response, and thereby the chromatic dispersion profile, of the gradient FP device used as a dispersion compensation module (DCM). Arrangement 500 includes a fiber optic input 520, which directs an input light 522 onto an interleaver 524. Input light 522 includes a plurality of channels at, for instance, different wavelengths. Interleaver 524 splits input light 522 into first and second split inputs 526 and 528, respectively, such that, for example, first split input 526 contains the odd channels and second split input contains the even channels. First and second split inputs 526 and 528 are directed into first and second DCMs 530 and 532, respectively, such that the odd and even channels are subjected to different phase responses at the DCMs. DCMs 530 and 532 then produce first and second split outputs 534 and 536, respectively, which are directed into a second interleaver 540. Second interleaver 540 combines first and second split outputs 534 and 536 to produce a dispersion compensated output light 542, which is directed away from arrangement 500 through a fiber optic output 544. In other words, in applications where it might not be feasible to manufacture an gradient FP device which provides continuous phase response across the wavelength region of interest, the incoming signal may be split into two or more split signals using an interleaver and the chromatic dispersion in the split signals may be corrected at any number of different DCMs. Then, the resulting outputs from the DCMs may be combined to form a dispersion compensated output signal containing all of the original channels.

Figure 10:
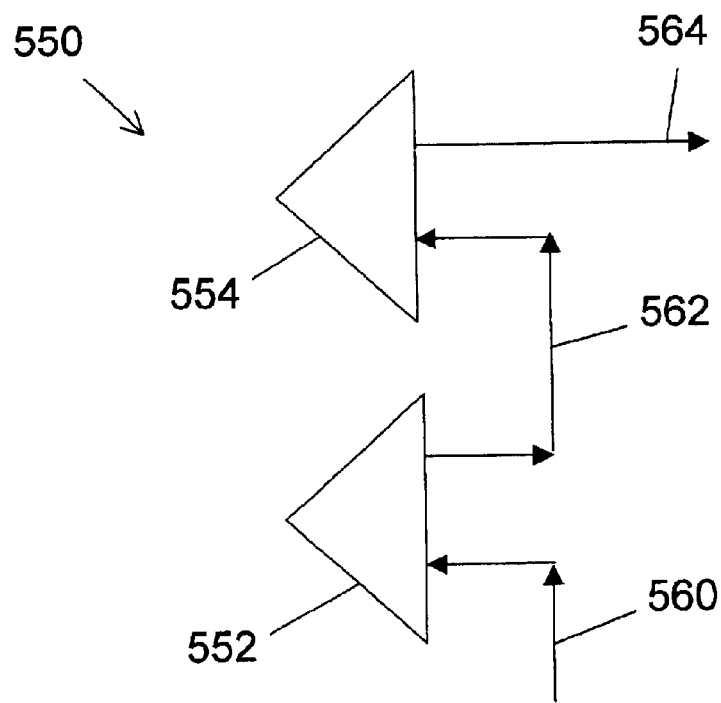
FIG. 10 is a schematic diagram of another optical configuration in which the single cavity Fabry-Perot device with the gradient reflector of the present invention is used as a dispersion compensation module, the optical configuration including multiple dispersion compensation modules in tandem to modify the total chromatic dispersion experienced by the input light.

Furthermore, DCMs may be cascaded in order to increase the total chromatic dispersion correction or to modify the chromatic dispersion slope of an input signal. For example, as shown in FIG. 10, an arrangement 550 includes first and second DCMs 552 and 554, respectively, which are cascaded together. An input light 560 is first processed through DCM 552, which produces an intermediate output 562. Intermediate output 562 includes the phase response provided by DCM 552 and is directed into DCM 554 for further dispersion compensation. DCM 554 then provides additional phase response to produce an output signal 564. Additional DCMs may be cascaded together to provide other dispersion compensation effects. DCMs may be identical or different depending on the desired total phase response.

Figure 11A:
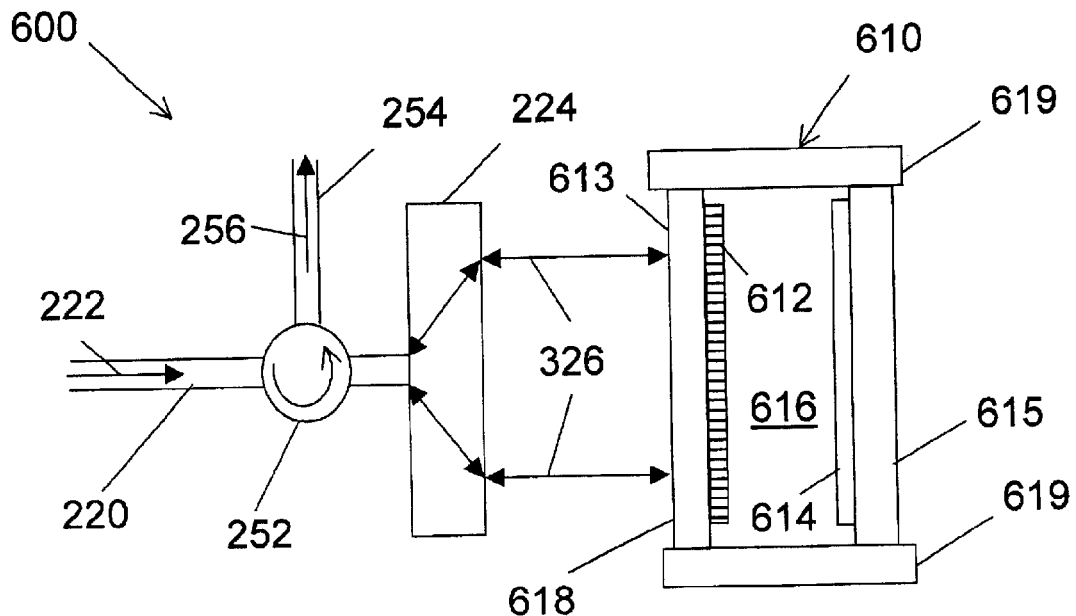
FIG. 11A is a schematic diagram of an optical configuration including a tunable single cavity Fabry-Perot device with the gradient reflector of the present invention.

As another variation, FIGS. 11A–11D illustrate a number of possible ways in which the FP gradient devices of the present invention may form tunable dispersion compensation modules. For example, as shown in FIG. 11A, an arrangement 600 includes an gradient FP device 610 with adjustable spacing between the reflectors forming the Fabry-Perot cavity. Gradient FP device 610 includes a gradient reflector 612, which is mounted on a first substrate 613, and a second reflector 614, which is mounted on a second substrate 615. Gradient reflector 612 and second reflector 614 are disposed in a spaced apart, confronting relationship. The space between the gradient reflector and the second reflector is filled with an etalon material 616, such as air. Gradient reflector 612 and second reflector 614 are secured on piezoelectric spacers 619 such that the spacing between the two reflectors is variable so as to alter the transmittance profile of gradient FP device 610. The change in the transmittance profile thereby results in a change in the group delay profile, and therefore the phase response, of gradient FP device 610. Second reflector 614 can have a reflectivity value of 100% or less, depending on whether an additional output through the second reflector is desired, for example, for monitoring purposes.

Figure 11B:
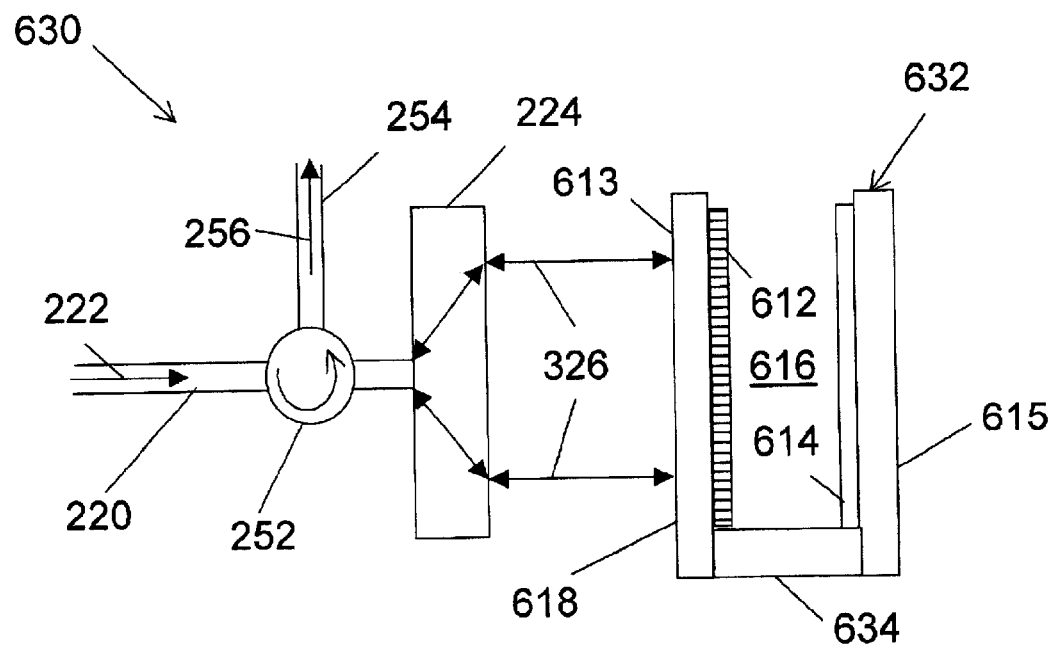
FIG. 11B is a schematic diagram of another optical configuration including a tunable single cavity Fabry-Perot device with the gradient reflector of the present invention.

FIG. 11B illustrates an arrangement 630 including an gradient FP device 632, in which gradient reflector 612 and second reflector 615 are separated by a microelectromechanical system (MEMS) element 634. MEMS element 634 acts as an electrostatic actuation mechanism to vary the spacing between the two mirrors such that the transmittance profile, and thereby the group delay profile, of gradient FP device 632 may be tuned.

Figure 11C:
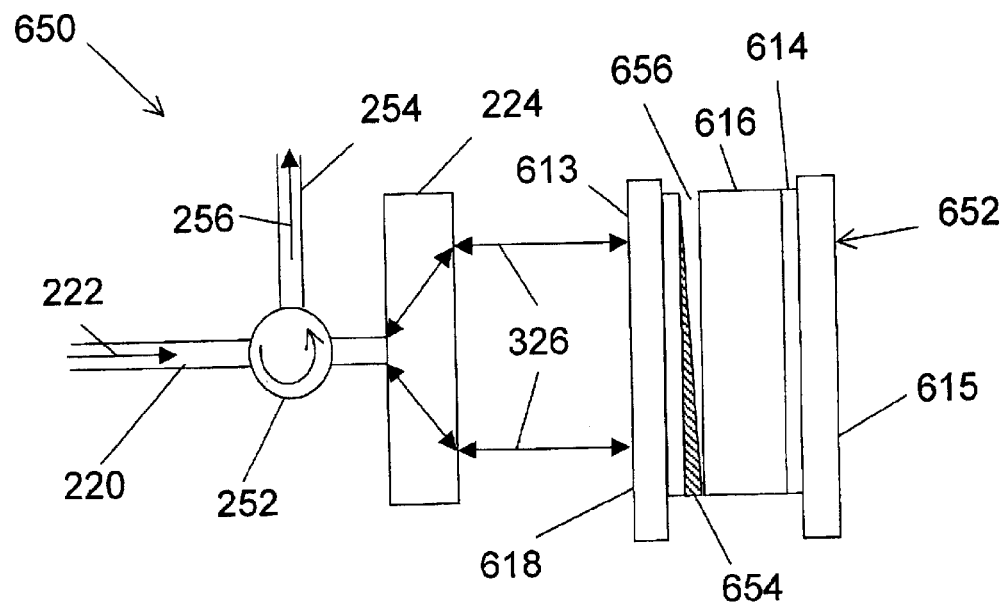
FIG. 11C is a schematic diagram of an alternative optical configuration including a tunable single cavity Fabry-Perot device with the gradient reflector of the present invention.

Alternatively, as shown in FIG. 11C, an arrangement 650 may include an gradient FP device 652, which is configured to include a wedge-shaped MEMS element 654. In gradient FP device 652, then, an air gap 656 is formed such that air gap 656 is adjustable by modulating MEMS element 654 by, for example, an applied voltage signal (not shown). As a result, the reflectivity exhibited by the combination of MEMS element 654 and air gap 656 may be changed. Also, the thickness of etalon material 616 may also be made adjustable by using, for instance, a tunable electro-optic material so as to change the distance between the reflective elements in gradient FP device 652.

Figure 11D:
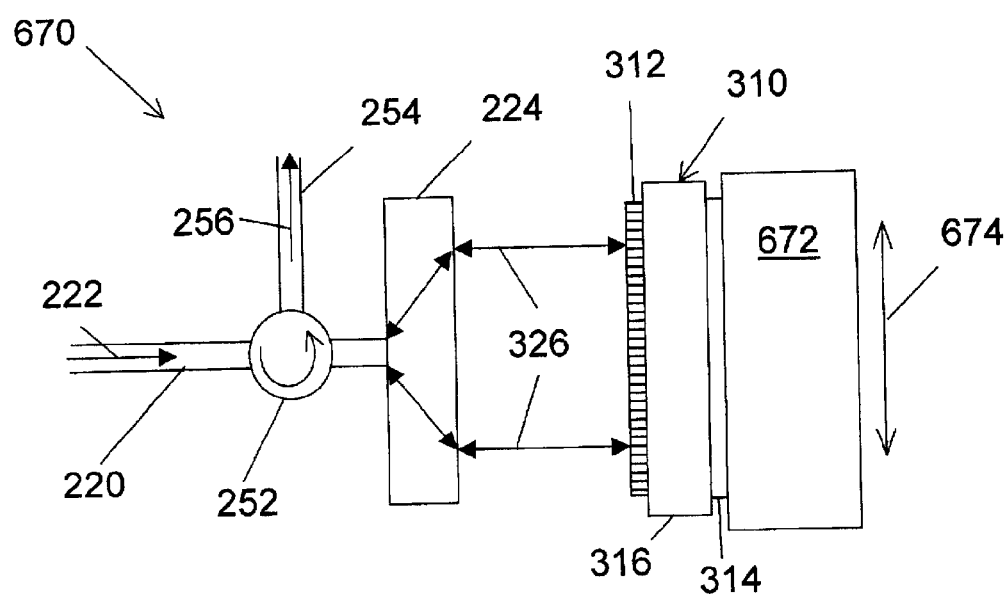
FIG. 11D is a schematic diagram of still another configuration including a tunable single cavity Fabry-Perot device with the gradient reflector of the present invention.

An arrangement 670 shown in FIG. 11D is substantially the same as the arrangement shown in FIG. 6A but the gradient FP device is mounted on a movable stage 672. Gradient reflector 312 may be configured to have variable reflectivity values along two dimensions (such as, for example, shown in FIGS. 4D–4F) such that, by moving the movable stage in a direction indicated by double-headed arrows 674 or in an orthogonal direction, for instance, collimated input beam 326 is incident on different portions of gradient FP device 310 such that the resulting transmittance profile, and thereby the group delay profile, is variable. Additionally, gradient FP device 310 can also be designed to have a plurality of sections which provide different chromatic dispersion effects (such as, for instance, positive dispersion, negative dispersion, constant dispersion, etc.) such that physically moving the gradient FP device yields different modes and levels of dispersion compensation on the incident light.

Figure 12:
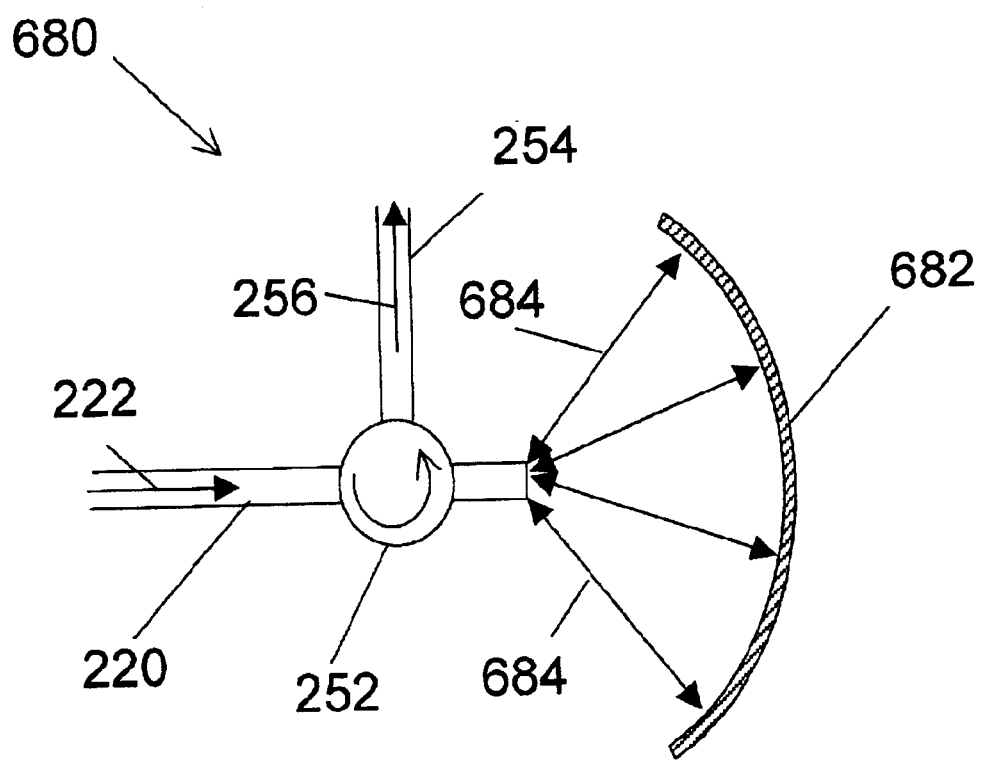
FIG. 12 is a schematic diagram of an optical configuration including a single cavity Fabry-Perot device with the gradient reflector of the present invention, in which the gradient reflector is configured on a curved surface.

Another possible modification to the gradient FP device of the present invention is to mount or form the gradient reflector on a curved surface. For instance, FIG. 12 illustrates an arrangement 680 including a curved gradient FP device 682. The curvature of curved gradient FP device 682 may be designed, for example, to match the numerical aperture of the fiber optic input such that light 684 exiting the end of the optical fiber will spread but still be incident on each point of the curved surface at normal incidence. Therefore, the use of a collimator is not required in arrangement 680.

The reflectance values across the gradient reflector may be arranged in any number of ways so as to achieve the desired transmittance profile, and thereby the desired phase response, from the gradient FP device of the present invention. Either positive or negative chromatic dispersion profiles may be created, and the resulting chromatic dispersion profile may be designed to be periodic, non-periodic, continuous or discrete in wavelength, depending on the specific application. Moreover, with proper selection of the materials used in the substrate, coatings, etc., the gradient FP device may be designed to be effective in essentially any wavelength range from the ultraviolet to far-infrared. Some materials suitable for use in the device include, but are not limited to, dielectrics, metals, semi-conductors, electro-optic materials, piezo-electric materials and birefringent materials. The variation in the reflectance values across the reflector may be formed by any suitable methods currently available or yet to be developed such as, for instance, mechanical grinding and polishing, use of specialized mask and vacuum deposition technologies, and use of a grayscale mask and photolithography. Substrate and/or etalon may be any suitable material including, but not limited to, a dielectric, metallic or semiconducting material such as, for example, vacuum, air, glass or quartz, as long as the material is transparent in the spectral region of interest. Furthermore, the substrate and etalon thickness can range from a few hundred nanometers to few tens of millimeters, depending on specific applications, desired values of group delay and chromatic dispersion, wavelength range, etc. Since subtle variations in reflectivity of the gradient reflector may be readily controlled by judicious material selection and fabrication procedure, it is possible to tailor the transmittance profile, and thereby the group delay and chromatic dispersion profiles, of the gradient FP device over a range of wavelengths. Furthermore, to alleviate polarization mode dispersion (PMD) and/or polarization-dependent loss (PDL), birefringent elements may be added into the afore-described arrangements to control the polarization of the input light prior to striking the FP gradient device.

Therefore, the present examples are to be considered as illustrative and not restrictive, and the invention is not to be limited to the details given herein, but may be modified within the scope of the appended claims.

What is claimed is:

1. An optical device for receiving input light and for acting on the input light to produce output light, said optical device comprising:
    a first reflector; and
    a second reflector supported in a spaced-apart, confronting relationship with the first reflector such that said input light received by the optical device, at least potentially, undergoes multiple reflections between the first and second reflectors and at least a selected one of the first and second reflectors is configured to subject each one of a plurality of different portions of said input light to one of a plurality of different reflectance values to produce an emitted light passing through the selected reflector in a way which is combinable to generate said output light, the selected one of the reflectors including a varying reflectance profile which defines said plurality of different reflectance values wherein said varying reflectance profile is a continuous, linear wedge function.

2. In an optical device for receiving input light and for acting on the input light to produce output light, a method comprising the steps of:
    supporting a first reflector and a second reflector in a spaced-apart, confronting relationship and configuring said first and second reflectors such that said input light received by the optical device, at least potentially, undergoes multiple reflections between the first and second reflectors;
    configuring at least a selected one of said reflectors to include a plurality of different reflectance values, the plurality of different reflectance values including a varying reflectance profile, the varying reflectance profile being a continuous, linear wedge function; and
    subjecting a plurality of different portions of the input light, during said multiple reflections, to the plurality of different reflectance values at the selected one of the reflectors to produce an emitted light passing through at least the selected reflector in a way which is combinable to generate said output light.

* * * * *